United States Patent
Gardiner et al.

(10) Patent No.: US 9,784,030 B2
(45) Date of Patent: Oct. 10, 2017

(54) LOUVERED LIGHT RE-DIRECTING STRUCTURE

(71) Applicant: SerraLux Inc., Los Gatos, CA (US)

(72) Inventors: Mark E Gardiner, Santa Rosa, CA (US); Robert Somers Ford, Los Gatos, CA (US)

(73) Assignee: SerraLux Inc., Los Gatos, CA (US)

( * ) Notice: Subject to any disclaimer, the term of this patent is extended or adjusted under 35 U.S.C. 154(b) by 0 days.

(21) Appl. No.: 14/850,731

(22) Filed: Sep. 10, 2015

(65) Prior Publication Data

US 2016/0186948 A1 Jun. 30, 2016

Related U.S. Application Data

(60) Provisional application No. 62/049,941, filed on Sep. 12, 2014, provisional application No. 62/050,018, filed on Sep. 12, 2014, provisional application No. 62/164,834, filed on May 21, 2015.

(51) Int. Cl.
| | |
|---|---|
| E06B 9/264 | (2006.01) |
| F21S 11/00 | (2006.01) |
| E06B 9/322 | (2006.01) |
| F21V 7/00 | (2006.01) |
| F21V 7/04 | (2006.01) |
| E06B 9/24 | (2006.01) |

(52) U.S. Cl.
CPC .............. *E06B 9/264* (2013.01); *E06B 9/322* (2013.01); *F21S 11/00* (2013.01); *F21S 11/007* (2013.01); *F21V 7/0091* (2013.01); *F21V 7/04* (2013.01); *E06B 2009/2417* (2013.01); *Y02B 80/50* (2013.01)

(58) Field of Classification Search
CPC .......... F21S 11/07; F21S 11/007; F21S 11/00; E06B 9/264
USPC ........................................... 359/595
See application file for complete search history.

(56) References Cited

U.S. PATENT DOCUMENTS

| | | | |
|---|---|---|---|
| 3,031,351 A | 4/1962 | McIlvaine | |
| 4,226,051 A | 10/1980 | Thompson | |
| 4,509,825 A * | 4/1985 | Otto | F21S 11/00 160/236 |
| 4,989,952 A | 2/1991 | Edmonds | |
| 5,461,496 A * | 10/1995 | Kanada | E06B 9/24 359/592 |
| 5,731,900 A | 3/1998 | Milner | |
| 5,802,784 A | 9/1998 | Federmann | |
| 5,880,886 A | 3/1999 | Milner | |
| 6,435,683 B1 | 8/2002 | Milner | |
| 6,616,285 B2 | 9/2003 | Milner | |
| 6,980,728 B2 | 12/2005 | Ladstätter et al. | |

(Continued)

FOREIGN PATENT DOCUMENTS

| | | | | |
|---|---|---|---|---|
| JP | WO 2014200113 A1 * | 12/2014 | ............... | E06B 9/28 |
| WO | WO 2014078812 A1 * | 5/2014 | ............... | E06B 9/24 |

*Primary Examiner* — Christopher Mahoney
(74) *Attorney, Agent, or Firm* — Edward S. Sherman

(57) ABSTRACT

Generally plano rectangular louvers are capable of being ganged in a stacked tiltable array to enhance light re-direction when titled to follow the solar elevation. Combinations of features and optical characteristic avoid optical artifacts and enhance efficiency of light utilization and manufacturing. Different louvers can be combined in alternative ways in such arrays.

31 Claims, 21 Drawing Sheets

(56) References Cited

U.S. PATENT DOCUMENTS

| | | | |
|---|---|---|---|
| 8,520,305 B2* | 8/2013 | Suzuki | B29D 11/00605 |
| | | | 359/597 |
| 8,873,146 B2 | 10/2014 | Gardiner | |
| 2003/0127197 A1* | 7/2003 | Lai | E06B 9/303 |
| | | | 160/115 |
| 2004/0253456 A1 | 12/2004 | Braybrook | |
| 2009/0009870 A1 | 1/2009 | Usami | |
| 2011/0043919 A1* | 2/2011 | Ko | E06B 9/24 |
| | | | 359/592 |
| 2013/0087294 A1* | 4/2013 | Khajavi | E06B 9/28 |
| | | | 160/174 R |
| 2013/0265642 A1* | 10/2013 | Vasylyev | G02B 19/0042 |
| | | | 359/595 |
| 2014/0104689 A1* | 4/2014 | Padiyath | G02B 5/0242 |
| | | | 359/592 |
| 2015/0226394 A1* | 8/2015 | Ueki | E06B 9/386 |
| | | | 359/595 |
| 2016/0076718 A1* | 3/2016 | Gardiner | F21S 11/007 |
| | | | 359/596 |
| 2016/0178164 A1* | 6/2016 | Nishida | E06B 9/303 |
| | | | 359/596 |
| 2016/0186949 A1 | 6/2016 | Sekido et al. | |

* cited by examiner

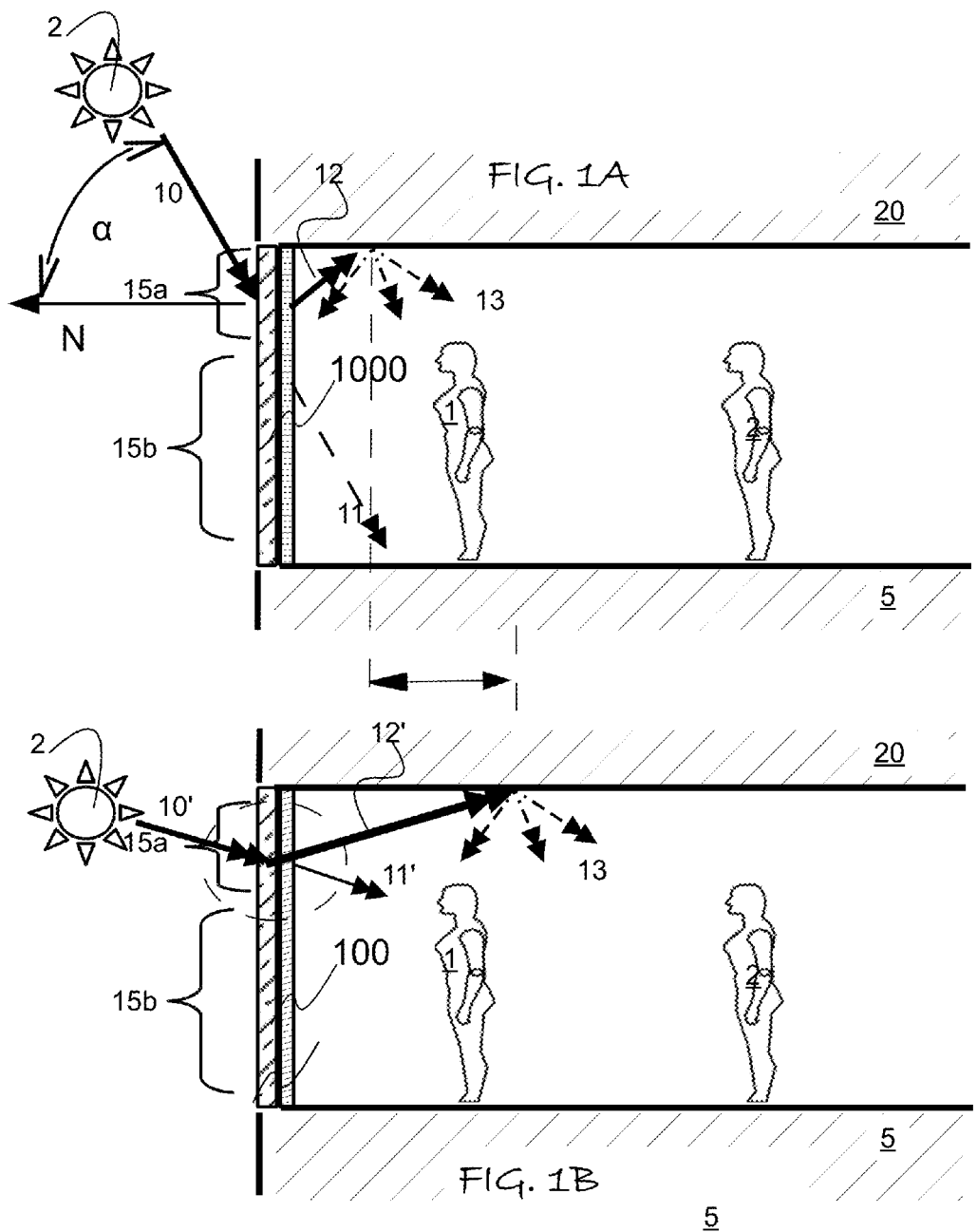

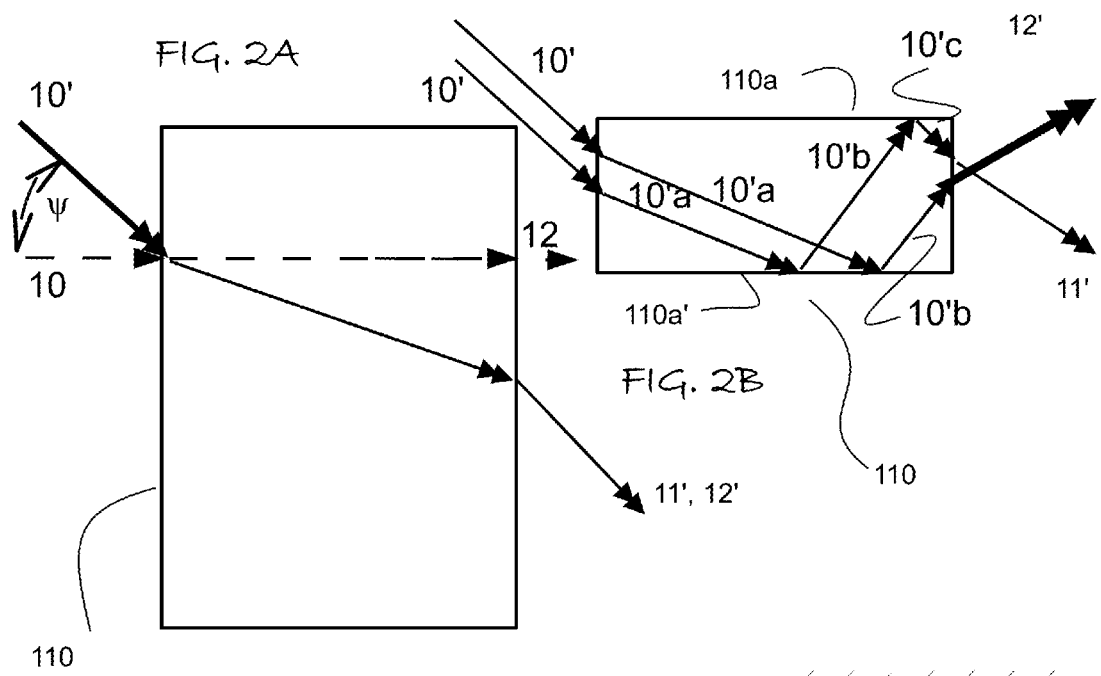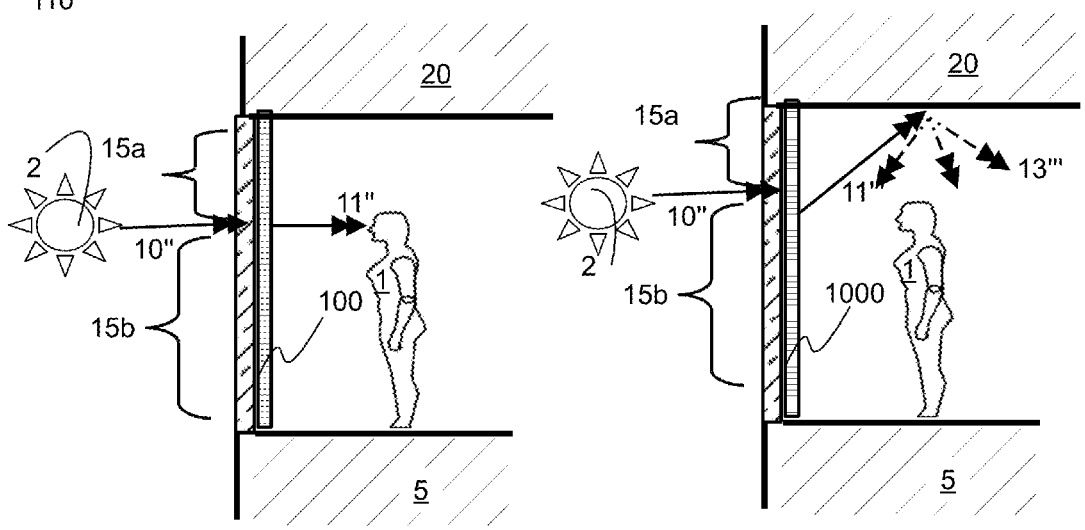

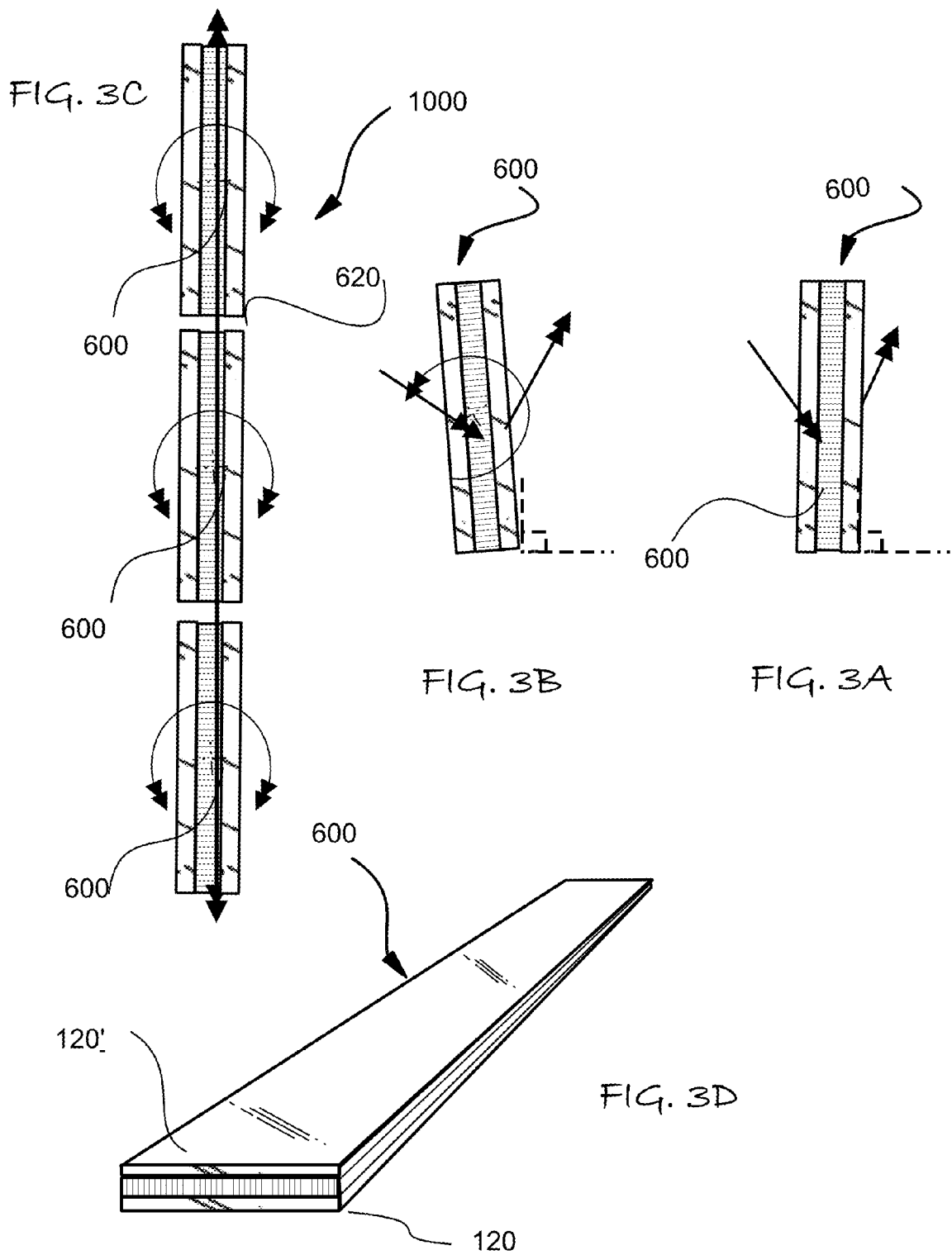

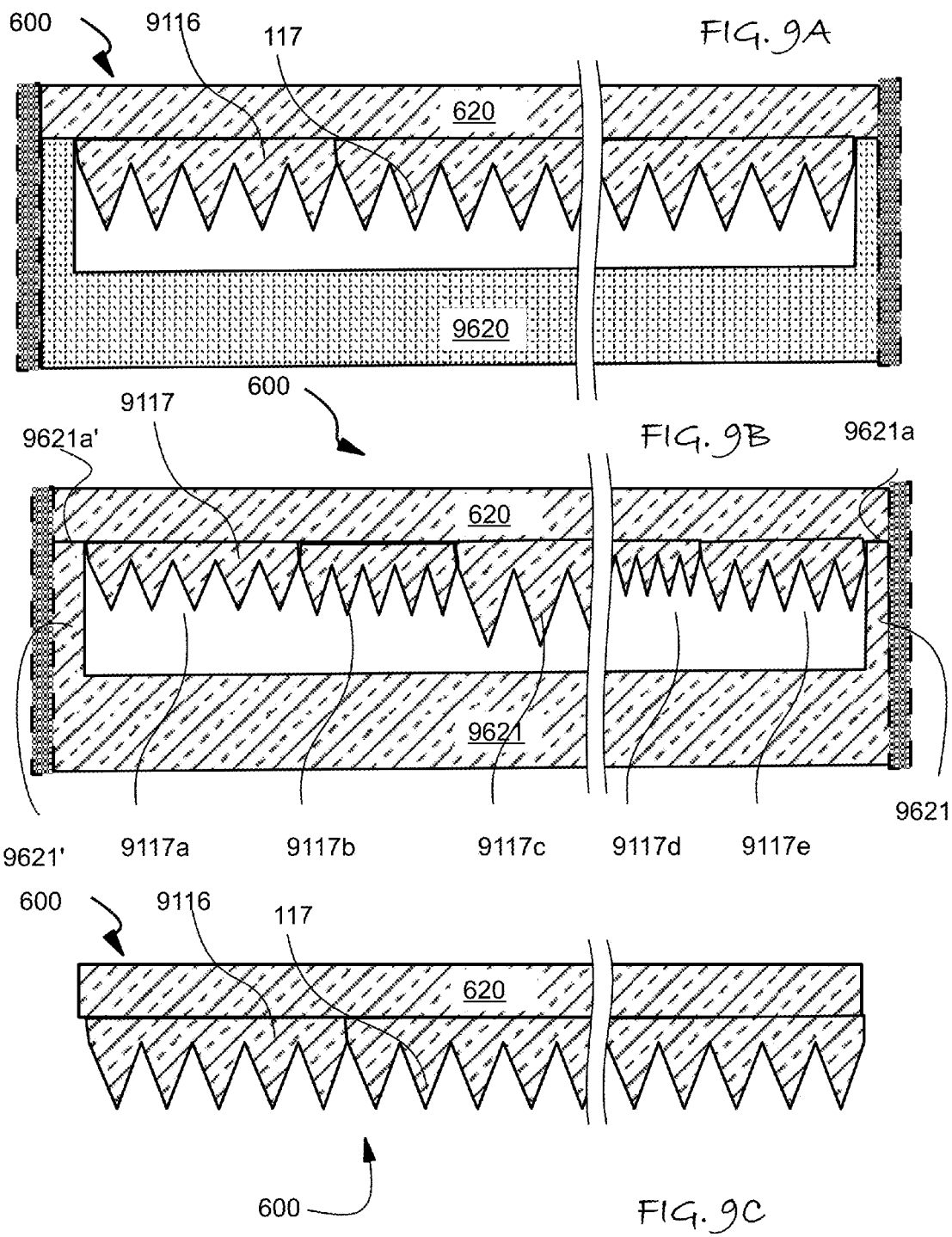

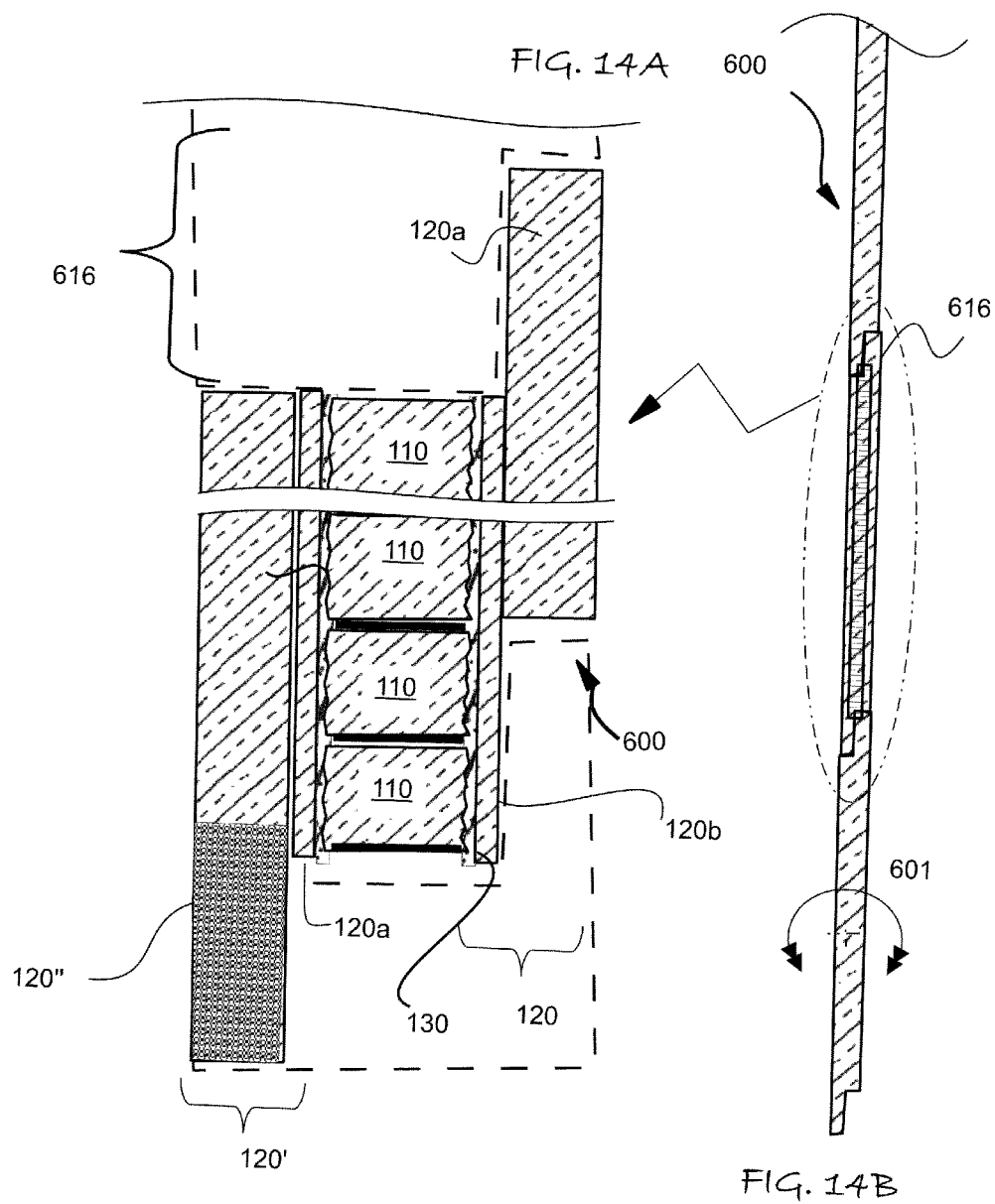

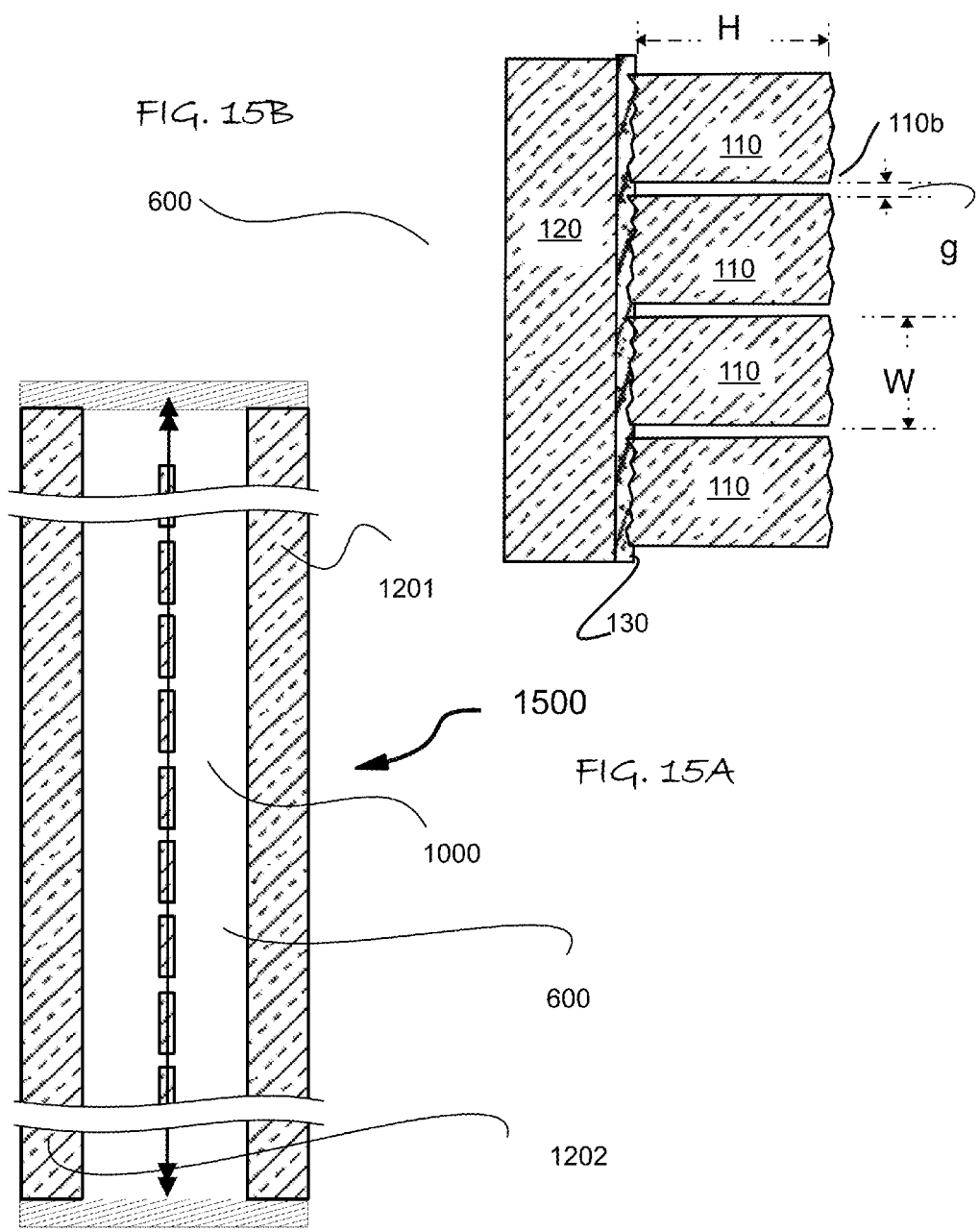

LOUVERED LIGHT RE-DIRECTING STRUCTURE

CROSS REFERENCE TO RELATED APPLICATIONS

The present application claims the benefit of priority to the US Provisional patent application of the same title that was filed on Sep. 12, 2014, having application No. 62/049,941, as well as the following applications: Appl. No. 62/050,018 (filed Sep. 12, 2014) and Appl. No. 62/164,834 (filed May 21, 2015), all of which are incorporated herein by reference.

BACKGROUND OF INVENTION

The field of inventions is light re-directing structures suitable for use with exterior glazing to selectively enhance the penetration of exterior light within an interior space.

Such light directing structures are well known and rely primarily on total internal reflection (TIR) of solar radiation, which has the highest angle of incidence on the glazing surfaces near noon time. A planar transparent member (which can either forms a glazing surface or is mounted parallel to a glazing surface) can re-direct light that would otherwise only reach the floor closest to the glazing. High angle incident light, rather than being transmitted directly toward the floor close to a window, is re-directed upward toward the ceiling so that it then scatters distal from the window, resulting in a farther penetration of natural light into the interior rooms of the structure.

It should be readily appreciated that controlling the re-directed angle allows for greater penetration of re-directed light, as the light incident at high angle near noon time, would be directed toward the ceiling rather than the floor, where it would be scattered to provide natural diffuse light from above, rather than glare from a polished or specular floor surface or absorbed by the floor (where it would not contribute to the illumination of work surfaces), and hence permit the minimization of the use of artificial lighting, as well as increase the productivity and well being of the additional inhabitants that enjoy natural light However, such light re-directing structures while generally effective have limitation and trade-offs between desirable benefits and undesirable effects. Further, the utility of current light redirecting structure are limited to a particular daylight hours.

Hence, it is a general objective of the invention to increase the efficiency of light re-direction while simultaneously greatly reducing the undesirable effects that may have been unappreciated or poorly understood in the prior art.

The above and other objects, effects, features, and advantages of the present invention will become more apparent from the following description of the embodiments thereof taken in conjunction with the accompanying drawings The above and other objects, effects, features, and advantages of the present invention will become more apparent from the following description of the embodiments thereof taken in conjunction with the accompanying drawings

SUMMARY OF INVENTION

In the present invention, the first object is achieved by providing a louver, comprising a generally rectangular planar support member having; an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, a light redirecting structure that is at least one of attached to and disposed within the planar support member, the light redirecting structure comprising a plurality of spaced apart light reflective surfaces that terminate at corners, wherein the light reflecting surface thereof extend across the planar support member from the front side to the back side in which each light reflective surface faces the front or back side, wherein the light reflective surfaces have a periodic pitch of more than 0.5 mm and the corners have a radius of curvature of less than 1% of the pitch.

A second aspect of the invention is characterized by such a louver wherein the reflective surfaces are parallel to the each other.

Another aspect of the invention is characterized by any such louver wherein the reflective surfaces are tilted with respect to the front and back side.

Another aspect of the invention is characterized by any such louver wherein the louver is symmetrical about a reference plane that is parallel to and spaced apart an equal distance from the upper surface and the lower surface.

Another aspect of the invention is characterized by any such louver further comprising an absorbing surface disposed parallel to and intervening with each light reflecting surface.

Another aspect of the invention is characterized by any such louver wherein the light reflective surface are metallic reflectors.

Another aspect of the invention is characterized by any such louver wherein the light reflective surfaces are total internal reflection (TIR) surfaces.

Another aspect of the invention is characterized by any such louver wherein the light re-directing structure is a film having grooves that define the TIR surface in which the film is laminated to the planar structure with a pressure sensitive adhesive.

Another aspect of the invention is characterized by any such louver wherein the light redirecting structure comprises a plurality of transparent solid polymeric bars having at least one light reflective surfaces oriented in facing the front or rear side, the bars having a common surface that is disposed at least nearly orthogonal to the at least one light reflective surface, a first transparent planar support member connecting the common surfaces on a first side of the bars, an adhesive material interposed between and connecting the polymeric bars and the planar support member, in which the adhesive material fills optical imperfection of the first side of the bars connected to the transparent planar support member.

A further aspect of the invention is characterized by a louver, comprising a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, a light redirecting structure that is at least one of attached to and disposed within the planar support member, the light redirecting structure comprising a plurality of spaced apart reflective surface that face the front or back side and extend across the planar support member orthogonal to the planes of the left and right side sides of the planar support member; wherein the light redirecting structure is a flexible film laminated to one of the first and second surface with a pressure sensitive adhesive.

A further aspect of the invention is such a louver in which the reflective surfaces are TIR surfaces and a groove having at least one tilted surface with respect to the upper surface in the flexible film forms the TIR surface.

A further aspect of the invention is such a louver in which the TIR reflective surface are on the sides of elongated elements having one or more side that are tilted with respect to the upper surface.

A further aspect of the invention is a louver, comprising a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, a light redirecting structure that is at least one of attached to and disposed within the planar support member, the light redirecting structure comprising a plurality of spaced apart reflective surfaces that are each parallel to the each other and extend across the planar support member orthogonal to the planes of the left and side sides of the planar support member; wherein the planar rectangular support member is transparent and the reflective surfaces are formed on triangular elements that extend upward from the planar face and further comprising an elongated channel member having a planar bottom and opposing upright sides that extend in the same direction away from the planar bottom to provide a generally U-shaped cover member that is at least one of transparent and translucent on the planar bottom thereof, the U-shaped cover having ends that are upright sides attached to planar member proximal to the front and back sides to seal the reflective surfaces within the channel.

A further aspect of the invention is such a louver wherein the reflective surfaces are tilted with respect to the front and back side.

A further aspect of the invention is a louver, comprising a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, a light redirecting structure that is at least one of attached to and disposed within the planar support member, the light redirecting structure comprising a plurality of spaced apart reflective surfaces that are each parallel to the each other and extend across the planar support member orthogonal to the planes of the left and side sides of the planar support member; wherein the front and back sides thereof are stepped.

A further aspect of the invention is a louver, comprising a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, a light redirecting structure that is at least one of attached to and disposed within the planar support member, the light redirecting structure comprising a plurality of spaced apart reflective surface that are each parallel to the each other and extend across the planar support member orthogonal to the planes of the left and side sides of the planar support member; wherein the front and back sides are light absorbing.

A further aspect of the invention is such a louver wherein the light redirecting structure is a flexible film laminated to one of the first and second surface with a pressure sensitive adhesive.

A further aspect of the invention is any such a louver in which the reflective surface are TIR surfaces and a groove in the flexible film forms the TIR surface.

A further aspect of the invention is any such louver in which the TIR reflective surface are on the sides of elongated trapezoidal elements.

A further aspect of the invention is any such louver where the left side and right are disposed in end clips.

A further aspect of the invention is such louver wherein the portion of the end clips that contacts the left and right sides provides a light absorbing structure to prevent glare.

A further aspect of the invention is a louver assembly comprising a linked array of the louver slats, each louver slat having a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, a light redirecting structure that is at least one of attached to and disposed within the planar support member, the light redirecting structure comprising a plurality of spaced apart reflective surfaces and extend across the planar support member from the front side to the back side in which each reflective surface is orthogonal to the planes of the left and side sides of the planar support member; wherein at least some of the louvers in the array are tiltable about a common central axis that extends between the right and lefts sides thereof, being disposed between the front and back sides of each louvers, the louvers in the arrays being subdivided by an upper sub-portion and a lower sub-portion below the upper sub-portion, in which each sub-portion is separately operable to differentially re-direct incident light than the other sub-portion.

A further aspect of the invention is such a louver wherein the upper and lower sub-portions comprise louvers that are separately tiltable from the other sub-portion A further aspect of the invention is any such louver wherein the upper and lower sub-portions comprise louvers have different light re-directing, transmitting or absorbing properties.

A further aspect of the invention is any such louver wherein one of the upper and lower sub-portions comprise louvers having different light blocking properties and the louvers in the other sub-portion are see through louvers.

A further aspect of the invention is any such louver wherein at least one of the upper and lower sub-portions comprises louvers having a light redirecting structure that is flexible film laminated to one of the first and second surface with a pressure sensitive adhesive.

A further aspect of the invention is any such louver in which the reflective surface are TIR surfaces and a V-shaped groove in the flexible film forms the TIR surface.

A further aspect of the invention is any such louver in which the TIR reflective surfaces are on the sides of elongated trapezoidal elements.

A further aspect of the invention is any such louver in which the louvers are continuously tiltable by a common actuator in which the each louver is operative to tilt by a progressively increasing amount from at least the adjacent louvers in one of the sub-portions.

A further aspect of the invention is any such louver in which the light reflecting surface are each parallel to the each other.

A further aspect of the invention is any such louver in which each louver in the array is support at the left and right side by end clips.

A further aspect of the invention is any such louver in which one or more louvers in the array is disposed at a non-parallel orientation with respect to at least one adjacent louver A further aspect of the invention is any such louver in which each louver in the array is support at the left and right side by end clips and the ends clips provide an angular bias that disposed the one or more louvers at a non-parallel orientation.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation view of the desired effect of light re-directing structures toward noon time when light is incident at high angles on vertical glazing surfaces, whereas FIG. 1B is a similar elevation view showing the actual effect of the configuration of FIG. 1A in the earlier in the morning or later in the day.

FIG. 2A is a plan view of the light rays propagating inside a portion of the optical structure of FIG. 1B, whereas FIG. 2B is elevation view thereof. FIG. 2C is a similar elevation view as FIGS. 1A and 1B, but for the sun being closer to the horizon in the early morning or much later in the day. FIG. 2D is a similar elevation view to FIG. 1B, in which various embodiments of the inventive structure may be deployed to extend the benefits shown in FIG. 1A.

FIG. 3A-C are expanded cross-sectional elevation of ganged louver assemblies, in which FIG. 3A corresponds to the orientation in the lighting conditions of FIG. 1A, and FIG. 3B corresponds to lighting conditions of FIG. 1B, and in which FIG. 3C is an optional orientation for the louvers in the assembly. FIG. 3D is a perspective view of an embodiment of the invention in the form of a louver panel of the assembly.

FIG. 9A-9C are schematic cross-sectional elevations of additional alternative embodiments of a light re-directing structure in a louver panel optionally deploying a thin film or sheet of optical material. The TIR surface on the exterior of macro or micro-prisms, and a micro-prism film is optionally laminated to a plano-plano optical sheet as shown in FIG. 9C. The plano sheet is optionally attached to a U-shaped channel that forms the body of the louver. In FIG. 9A the U-shaped body is preferably translucent and diffusing to avoid color banding by diffraction, whereas in FIG. 9B the U-shaped channel is transparent. In FIG. 9C the body of the louver is the planar (plano-plano) member to support the sheet of optical material having the micro-prisms of either FIG. 9A or 9B.

FIG. 14A is a enlarged view a portion of the cross-sectional elevation of the ganged louver assembly in FIG. 14B in at least some of the slats have beveled edges to laterally seal as in the vertical orientation of FIG. 14A.

FIG. 15A is a cross-sectional elevation view of a louver assembly in a sealed window, in which FIG. 15B is an enlarged sectional view of the louver structure.

FIGS. 19A and 19B is a cross-section elevation view of an alternative ganged louver array assembly in which the louvers are separately tiltable to different angles, in which FIG. 19C is a perspective view of a louver and a schematic illustration of the tilt mechanism

DETAILED DESCRIPTION

Figure 4:
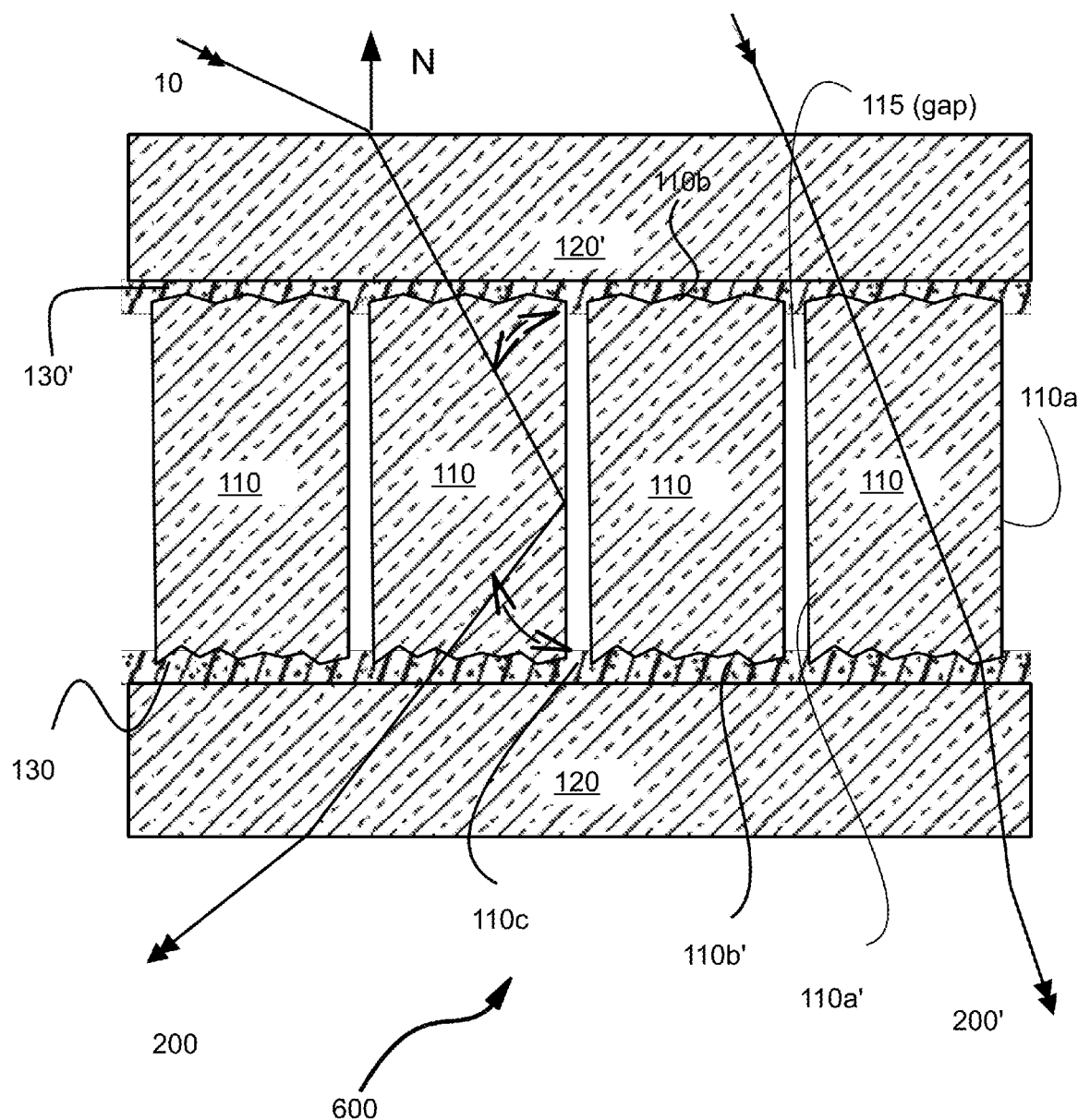
FIG. 4 is a schematic cross-sectional elevation of a preferred embodiment of a light re-directing structure in a louver panel of FIG. 3D, deploying macro spaced TIR surfaces having a low radius of curvature at the corners to minimize glare.

Referring to FIGS. 1A through 21, wherein like reference numerals refer to like components in the various views, there is illustrated therein a new and improved Louvered Light Re-Directing Structure, generally denominated 1000 herein.

In accordance with the present invention the Louvered Light Re-Directing Structure 1000 comprises a plurality of elongated narrow and thin slats, which individually or collectively have specific constructions described in details below. Other aspects of the invention include deploying slats with different constructions, and that are separately adjustable.

A slat or individual louver should be understood to be a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the front side, and a light redirecting structure either attached to or disposed within the planar support member. The light re-directing structure would comprise a plurality of spaced apart light reflective surfaces that terminate at corners, wherein the light reflecting surface thereof extend across the planar support member from the front side to the back side; so that each reflective surface is orthogonal to the planes of the left and right side sides of the planar support member.

In some preferred embodiments described more fully below, the light reflective surfaces preferably have a periodic pitch of more than about 0.5 mm and the corners have a radius of curvature of less than 1% of the pitch.

In other embodiments in which different louvers are combined in an stack, in which the louvers are titltable, each louver need not have (or have the same) light redirecting properties as the other louvers FIG. 1A illustrates the preferred use of a day light re-directing structure 100 to direct at least some portion of light rays 10 incident at high angles from the sun 2 on glazing 15 away from the path 11 it would otherwise take in a room toward the floor 5, and re-direct back upward towards the ceiling 20 as ray 12. Thus, incident sunlight is re-directed to the ceiling 20, as ray 12, where it will be scattered off the ceiling 20, providing occupant 2, whom is farther from a window glazing 15 than occupant 1, with diffused natural light 13. In FIG. 1B, the sun 2 is at a slightly lower elevation, some rays 10' would also be re-directed, as rays 12', though deeper in the room, where it is scattered off the sealing as diffused natural light 13'. However, as illustrated in FIGS. 2A and 2B, when the sun elevation decrease, there is to an increase in azimuthal angle (w) of incidence on glazing surface 15 and optical element 110, which has reflective upper and lower surface 110a and 110a'. Hence, the light incident on any optical structure used for light re-direction will have a greater path length as shown in the plan view in FIG. 2A, in which ray segment 10a within the optical structure is longer as the azimuthal angle increases. Thus, some of these rays as shown in elevation view in FIG. 2B, entering the optical element 110 as ray 10'a, will undergo a first reflection at the lower surface 110a', and then be directed upward and in the room direction as ray segments 10'b, exits as ray 12'. However, others rays will actually undergo 2 reflections, the second on the upper reflective surface 110a, and continue to the exit face of the optical element 110 as ray segment 10'c, thus be transmitted downward as exiting ray segment 11'. Thus, optical re-directing structure will lose efficiency during the day as the suns position changes.

Such optical re-directing structure can have several additional undesirable effects depending on where they are applied on the window. FIG. 2C illustrates the potential dilemma when the sun 2 is at a very low elevation, such as the morning or late afternoon, and light rays thereform 10" are nearly parallel to floor and ceiling, being at near normal incidence to the window glazing 15. Absent the re-directing structure 100, this sunlight would be directly at the first occupant's 1 eyes as ray 11'. The incident sunlight would not be re-directed at by the structure in FIG. 1B because it is at normal incidence and hence below the critical angle for Total Internal Reflection (TIR).

Hence, conventional light re-directing film applied on the entire window surface would not be able to provide the benefit of FIG. 1A, and also alleviate the annoying direct light in FIG. 1B. Hence, as such light re-directing film in many cases also limits see through visibility, the application would be limited to the clerestory portion of the window 15a, and the lower portion 15b of the window or glazing 15 would be covered with conventional shades or blinds.

In various embodiments of the invention 1000, described in further details below, the benefits of light-redirecting structure can be optimized for a wider range of lighting conditions and intended room uses, and thus be beneficial utilized rather than blocked in the situations illustrated in FIG. 2B, or alternatively partially leaked rather than re-directed as shown in FIGS. 1B and 2A and 2B.

In FIG. 2D, the light re-directing optical structure 1000, is an assembly of louver or slat elements 600 (as shown in FIG. 3A among others), with each element 600 being an independent light re-directing optical structure, which at least a portion of the assembly are capable of rotation to accommodate the variation in sun angle over the day. Thus, as will be explained with respect to specific embodiment, the tilting of the louvers or slat 600 permits the re-direction of even normal incident sunlight 10''', as rays 12''' which scatter off the ceiling as rays 13'''. In more preferred embodiment, the leakage of light as rays 11' in FIG. 2B is also reduced or eliminated.

Each louver or slat 600 is transparent rigid planar support surface in a rectangular shape having opposing faces, and a set of orthogonal front and rear faces and left and right sides, in which the faces are longer than the side.

Light re-directing films and sheets are well known and are generally formed by micro-fabrication methods in which the TIR surfaces are less than about 1 mm wide. Such micro-fabrication typically deploys micro-replication of a master surface or mold with which a resin impregnates the contours of the master surface so that upon curing and removal the master surface is replicated in reverse. Some micro-replication methods are well suited to roll to roll processing of wide webs of flexible films. A web of flexible film can be readily slit and cut to custom sizes, as may be required for direct application to an installed window glazing surface, or the glass panel or plates used to fabricate sealed glazing type windows. However, it has come to be appreciated that such micro-fabricated structure, have several performance limitations.

While in some embodiment the slat or louver 600 may contain a continuous layer of thin flexible film, in more preferred embodiments, the slat or louver is a collection of assembled macro-elements to provide particular performance advantages.

In general, the light re-directing structure disposed on or part of at least one of the opposing faces of the planar support. Hence, at least a portion of the incident light will be selectively re-directed on transmission depending on the angle of incidence. In most embodiments, light at a low angle of incidence is deflected on transmission and re-directed above the surface normal to travel in the opposite direction as the incident light.

When the reflective surfaces are formed for total internal reflection (TIR), light at higher angle of incidence is transmitted at an angle below the surface normal to travel in the same direction as the incident light. As TIR only occurs above a critical angle of incidence dependent, replacing TIR with metallic reflective surface, allows some portion of near normal incident light to be re-directed as well.

Hence, as shown in FIG. 2D, the structure 1000 can replace optical elements 100 placed on the window, at least on the clerestory glazing portion 15a, to similarly direct the transmitted sunlight to the ceiling 20 as in FIG. 1A when the louvers 600 are essentially vertical in FIG. 3A. Preferably, the structure 1000 can cover the entire glazing surface, including floor to ceiling windows, or any portion thereof.

With reference to FIG. 3B, the louvers in at least the clerestory portion are titled forward (counter clockwise), so that incident light rather than being directly transmitted toward the eyes of occupant 1, each louver could be tilted so that the light arrived at the surface within the angle necessary for TIR and reflected upward, in this example that the light penetrates further into the structure Finally, as shown in FIG. 3C, the louvers can be tilted horizontally to maximize external views, as could be desired at night or when only diffuse light is incident on the glazing, such as on a cloudy day or when the sun's apparent position has swung to the opposite side of the building.

It should be appreciated in the examples of FIG. 1A-2B, the sun will never be in the same vertical plane when the horizontal elevation (azimuthal angle) changes from FIG. 1A to 1B (and FIG. 2C), but at an oblique angle between these positions due to the earth's rotation.

As one objective of the invention is to minimize glare from the light re-directing structure, the optical structure shown in FIG. 3A-D has preferred dimensions that are disclosed in the U.S. Provisional patent application No. 62/038,956 filed on Aug. 19, 2014, which is incorporated herein as an Appendix.

Figure 5:
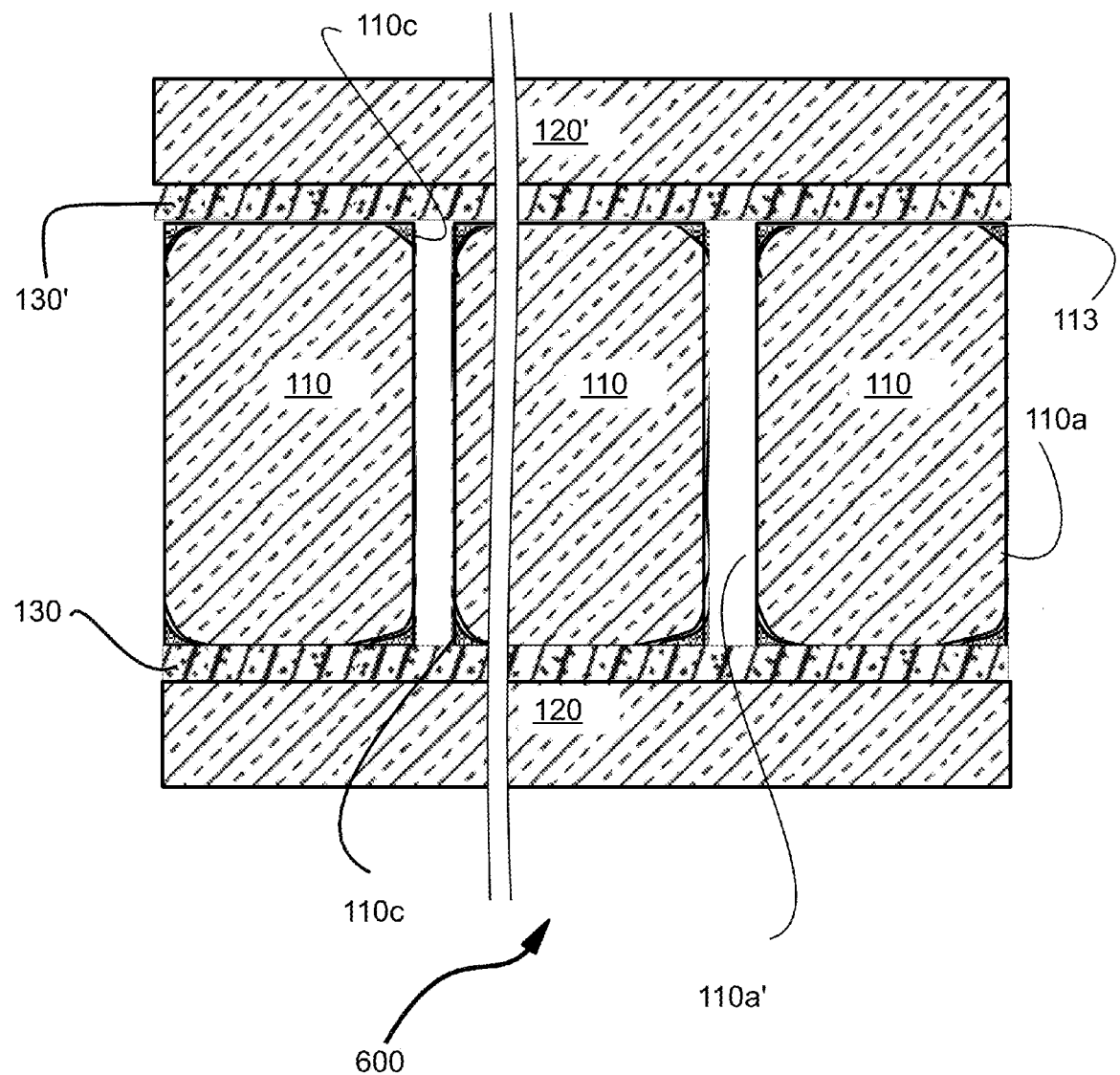
FIG. 5 is a schematic cross-sectional elevation of an alternative embodiment of a light re-directing structure in a louver panel of FIG. 3D deploying macro spaced TIR surfaces having blackened corners to minimize glare.
Figure 6:
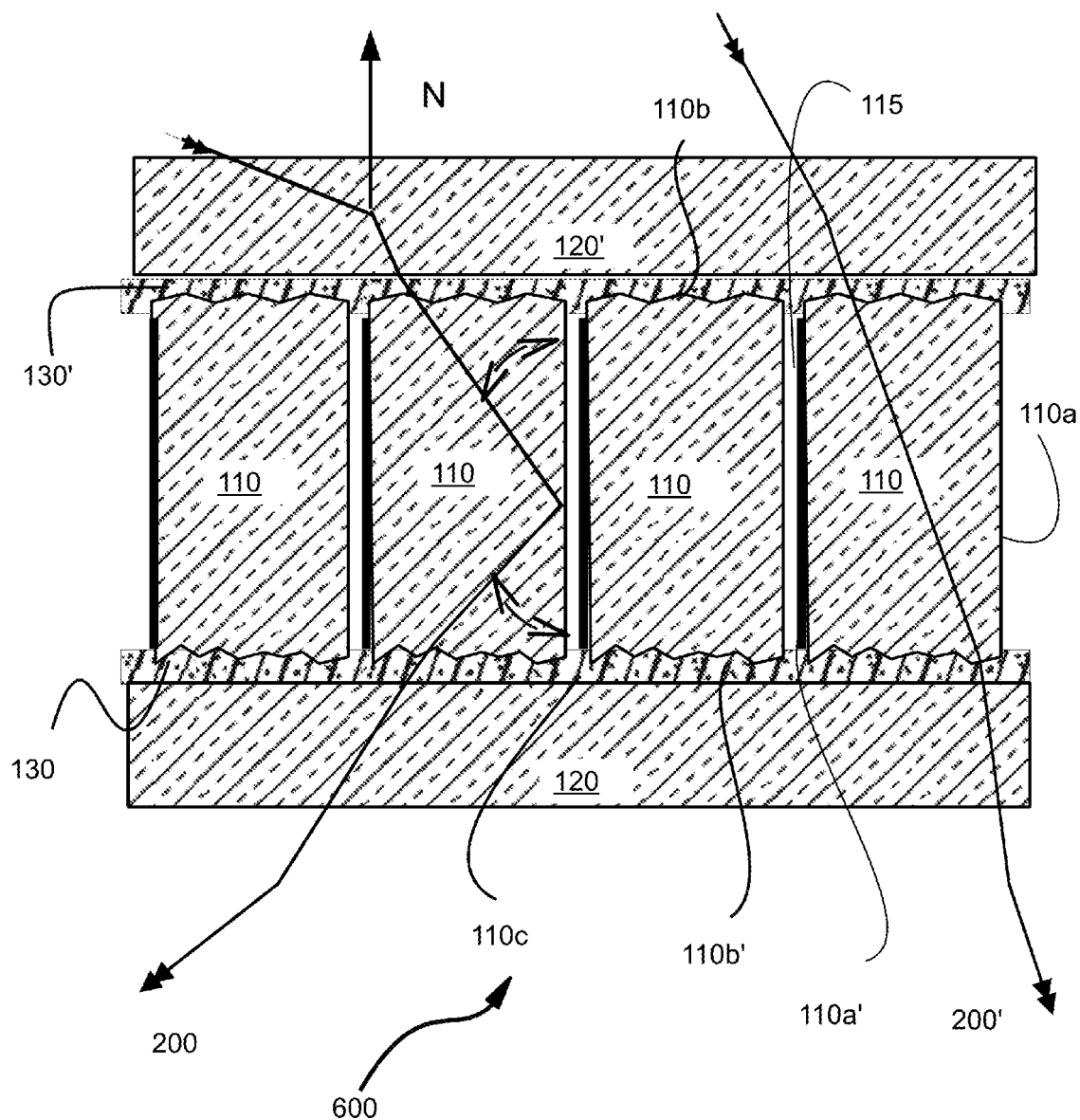
FIG. 6 is a schematic cross-sectional elevation of an alternative embodiment of a light re-directing structure in a louver panel of FIG. 3D deploying macro spaced TIR surfaces with alternating blacked faces to provide asymmetrical light re-direction.

While the light directing louvers 600 can optionally deploy any transparent substrate to support a light directing film, they preferably have the structure shown in FIGS. 4 to 6.

FIG. 4 is a schematic cross-sectional elevation of a first preferred embodiment of a light re-directing structure in a louver panel of FIG. 3D deploying macro spaced TIR surfaces having a small radius of curvature at the corners to minimize glare. TIR surface 110a and 110a' are on opposing sides of the optical elements 110, which have four corner 110c, with the TIR surface being defined by the gap, g, between each adjacent optical element 110. The optical elements 110 are preferably attached with adhesive layers 130 and 130' to a optical quality transparent substrate and superstrate 120 and 120'. Preferably, the substrate and superstrate 120 and 120' have the same thickness to create a vertically symmetric structure to preclude distortion from thermal expansion. Glare is minimized by deploying optical elements 110 with a pitch between elements 110 of at least about 0.5 mm, and more preferably greater than 1 mm, with corners 110c having a radius of curvature of less than 1% of the optical element spacing or pitch, that is the element width plus the thickness of the gap 115, and more preferably less than 0.5% of the element spacing or pitch. Alternatively, in the embodiment deploying parallel sided optical elements 110 at least some of the otherwise TIR provided by gap 115 can be metalized and need not depend on the gap to provide TIR.

FIG. 5 is a schematic cross-sectional elevation of an alternative embodiment of a light re-directing structure in a louver panel of FIG. 3D in which glare is minimized by deploying optical elements 110 with a pitch between optical elements 110 of at least about 0.5 mm, and more preferably greater than 1 mm, having blackened corners 110c. The blackened corners reduce glare where the radius of the corner 110c is not sufficiently small.

FIG. 6 is a schematic cross-sectional elevation of an alternative embodiment of a light re-directing structure in a louver panel of FIG. 3D deploying macro optical elements 110 with alternating blackened faces 110a' to provide asymmetrical light re-direction. The blackened faces 110a' are positioned to face down relative to the solar elevation, so that any potential multiple reflections illustrated as ray segment 10c' in FIG. 2B are absorbed, and do not cause glare from rays that would otherwise be re-directed back in the same direction as incident solar rays 10', that is back down toward the interior floor (rays 11').

Figure 7:
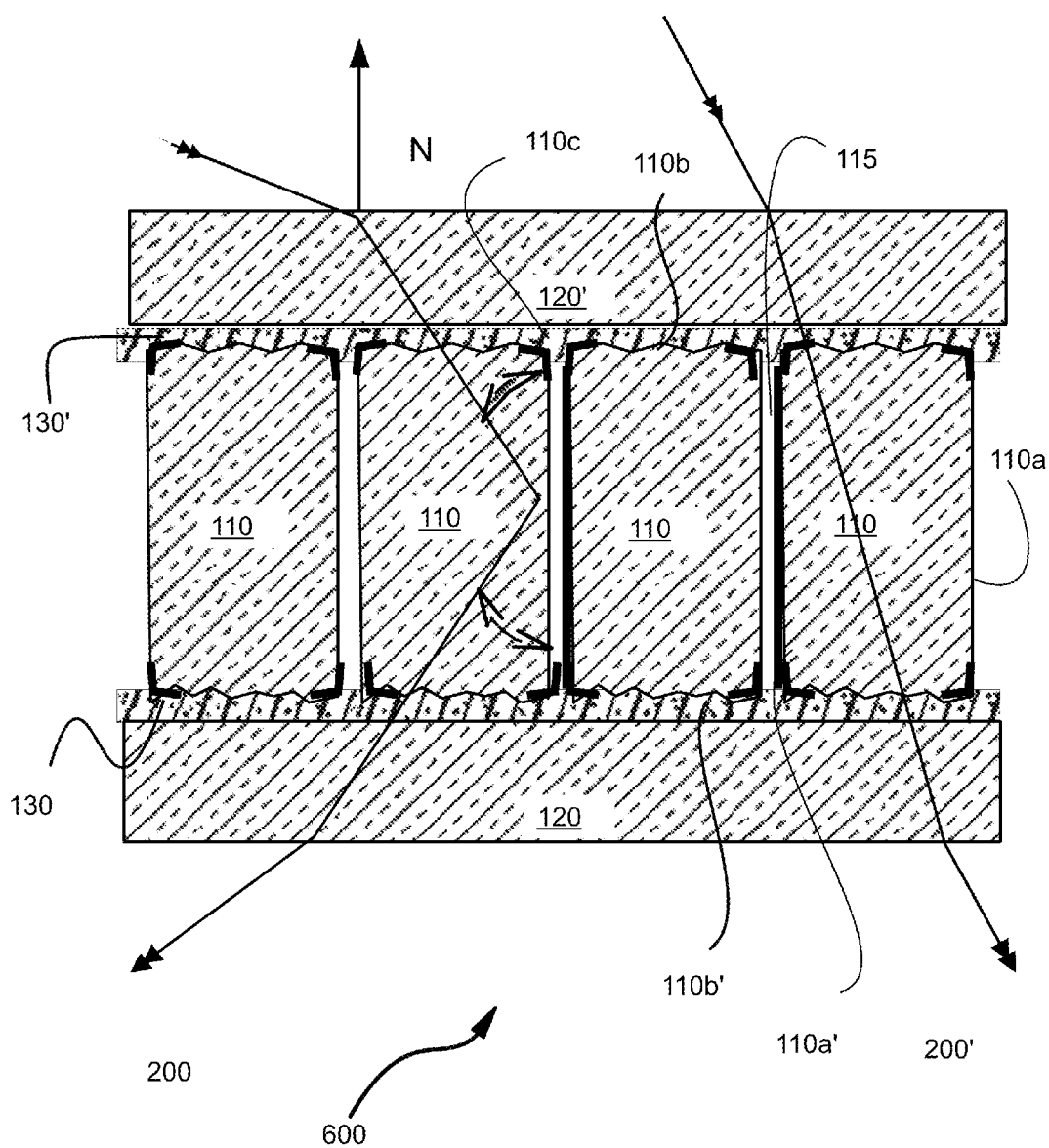
FIG. 7 is a schematic cross-sectional elevation of an alternative embodiment of a light re-directing structure in a louver panel of FIG. 3D deploying macro spaced TIR surfaces having blackened corners to minimize glare as well as alternating blackened faces to provide asymmetrical light re-direction.

FIG. 7 is a schematic cross-sectional elevation of an alternative embodiment of a light re-directing structure in a louver panel of FIG. 3D deploying macro optical elements having blackened corners 110c to minimize glare as well as alternating blacked faces 110a' to provide asymmetrical light re-direction.

Figure 8A:
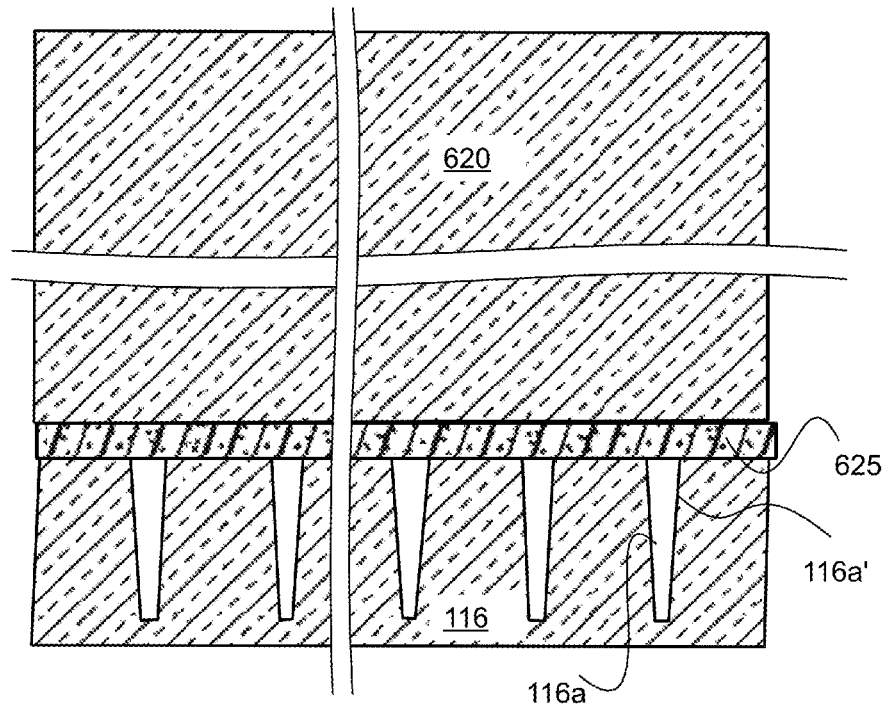
FIG. 8A is a schematic cross-sectional elevation of an alternative embodiment of a light re-directing structure in a louver panel of FIG. 8B in which a thin film or sheet of optical material with micro or macro spaced TIR surfaces is laminated to a plano plano optical slat.
Figure 8B:
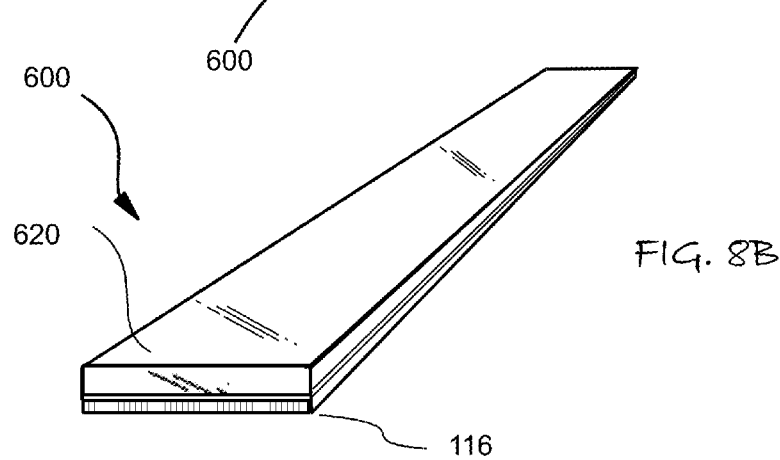

FIG. 8A is a schematic cross-sectional elevation of an alternative embodiment of a light re-directing structure in a louver panel of FIG. 8B in which a thin sheet of optical material 116 with micro spaced TIR surfaces 116a and 116a' is laminated to a plano plano optical panel 620 with a clear, non-scattering optical adhesive layer 625 to form louver 600. The optical panel 620 provides sufficient rigidity to the slat or louver 600. The TIR surface are defined by grooves in the sheet to provide the intervening trapezoid shaped and spaced apart member, with tilted sides that form the groove walls and TIR surface, per the preferred aspects ratios (1.6:1) of the similar but rigid embodiments of FIG. 12A to 13B.

FIGS. 9A and 9B are schematic cross-sectional elevations of further alternative embodiments of a light re-directing structure in a louver panel 600 in which a thin film or sheet of optical material 9116 has TIR surfaces on sides of prism, which are optionally 45 degree micro-prisms 117. The sheet is optionally laminated to a plano-plano optical sheet 620, which in turn is attached to a U-shaped 9620 channel that forms the body of the louver 600. The prisms 117 can be symmetrical or asymmetrical and can have included angle different from 45 degrees. In FIG. 9A the U-shaped body 9600 is preferably translucent to randomly scatter or diffuse light to avoid color banding by diffraction. Alternatively, in FIG. 9B the U-shaped channel 9621 is transparent as the thin sheet of optical material 9117 is structured with a quasi-random variation in micro-prism spacing in blocks 9117a and *b* (but more preferably 9117*c* and 9117*d*) which optionally vary in one or more of lateral width and provide a slight variation in micro-prism pitch to merge color bands and avoid the need for an optical diffusing cover 9620. While the micro-prism portion in 117 will still produce glare, they will also diffract and disperse light, which can also lead to color banding. However as each of the block 117*a-d* vary in pitch the effective dispersion of colors occurs over a wider angular range. More preferably, by keeping the block length short, the diffracted light is further spread over wider angles. As the variation in pitch will displace the center of each diffraction order slightly, the color bands may then overlap in each order, and preferably cause the orders to be so spread out angularly so the colors mix to form white light. Eliminating a diffuser provides better transparency to allow the perception of the city or landscape features that surround a building, enhancing the feel that the lighting is indeed natural. Alternatively, a thin film or sheet of micro-prisms, or a thicker sheet of macro-prisms can be attached to or form a generally planar sheet as shown in FIG. 9C.

It should be appreciated that the embodiments of FIG. 9A-B deploy the U-shaped channels 9620 so that the upright sides 9621 and 9621' provide stiffness to the louver 600, and provide an upper edge surface 9621*a* spaced above the tops of prism 116 and 9621*a'* to attached the planar cover or support 620 to form a sealed protective cavity around the micro prisms 117. In FIG. 9C the channel is replaced by a planar (plano-plano) member to support the sheet of optical material have the micro-prisms of either FIG. 9A or 9B.

Figure 10:
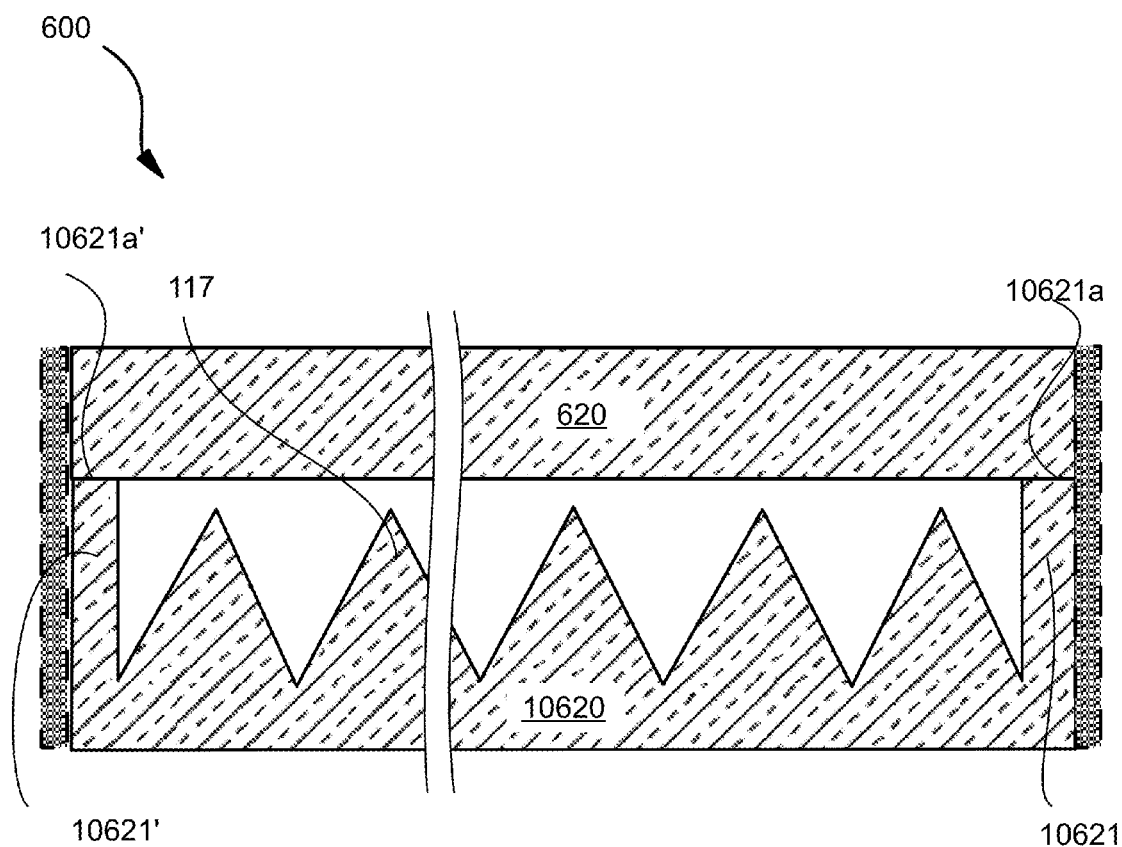
FIG. 10 is schematic cross-sectional elevation of another alternative that deploys a TIR surfaces formed on 45 degree prisms within a U-shaped channel in which the channel is molded with macro-size prisms and a transparent plano-plano sheet covers the channels. In other embodiment, the louver may deploy the same prism molded directly on a generally planar member forming a first surface, whereas the opposing or second surface is plano.
Figure 12A:
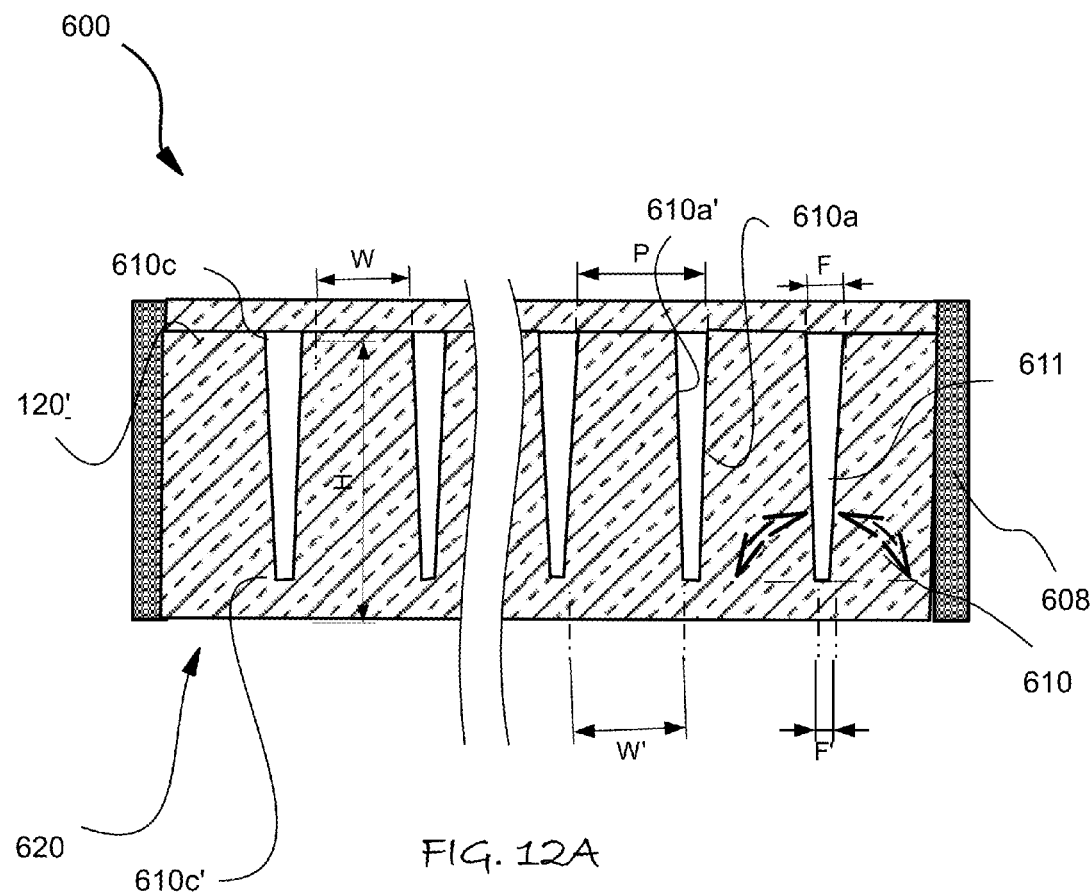
FIG. 12A is a schematic cross-sectional elevation of an alternative embodiment of a light re-directing structure in a louver panel shown in perspective view in FIG. 12B deploying macro spaced TIR surfaces and blackened sides. The slat has a front cover. The TIR surfaces are tilted symmetrically forming the sides of V-shaped grooves.
Figure 12B:
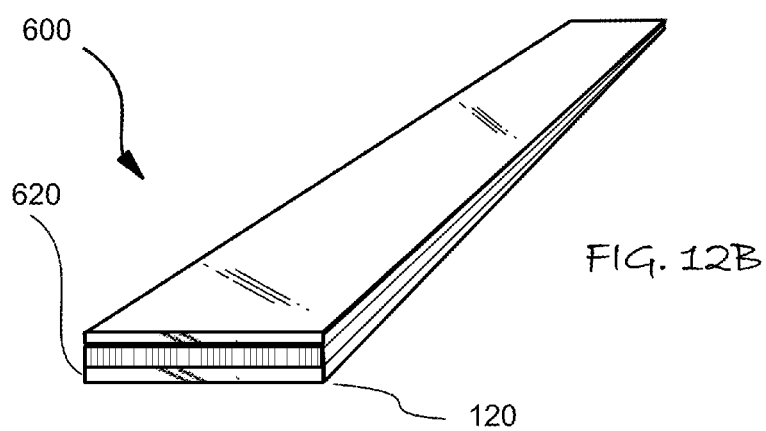

Hence, FIG. 10 is schematic cross-sectional elevation of another alternative embodiment that deploys a TIR surfaces formed on prisms 117 (optionally having a 45 degree included angle) that are within a U-shaped channel 10620 in which the channel is molded with macro-size prisms 117 and a transparent plan-plano sheet 620 optionally covers the channel. It should be appreciated that the embodiments of FIG. 10 deploy the U-shaped channel 10620 so that the upright sides 10621 and 10621' provide stiffness to the louver 600, and provide an upper edge surface 10621*a* spaced above the tops of prism 116 and 10621*a'* to attached the planar cover or support 620 to form a sealed protective cavity around the macro-prisms 117. The macro-prisms preferably have a pitch of 0.5 mm or greater, and more preferably 1 mm or greater to minimize glare and color separation from diffraction of light from the prism peaks and valleys. Further, this embodiment of the louver 600 allows the TIR surface on the macro-prisms 117 to be formed by molding, and optionally extrusion of a profile, and eliminated the need for a protective diffusing cover provided, the corners are sufficiently non-rounded to reduce glare. It should be understood in the embodiments of FIGS. 9A-B and 10 that the bottom of the louver 600 is optionally intended to face the glazing surface in use so that external sunlight is incident on the plano surface opposite the prisms 117. It should also be understood in these embodiment that providing blackened or black coating 608 on long sides 605 and/or short edges 606 described below with respect to FIGS. 12A and 12B is optional, as it is with any of the louver configurations disclosed herein. More preferably, the macro-prisms preferably have a pitch of 0.5 mm or greater circa 0.5 mm or greater, and the corners of the TIR or reflective surfaces have a radius of curvature of less than about 0.5% of the element spacing/pitch. If the corners have a larger radius of curvature, glare can be eliminated by making the rounded or otherwise non-square surfaces absorbing. It should be appreciated that the preferred methods of fabricating such structure either provide sharp corners, or permit selective blackening of the corners.

The louvers 600 can also be formed by the lamination of any known or later invented type of micro-structured film to a plano-plano slat or sheet 620 as is illustrated in FIG. 8-10, either with or without a cover sheet.

Figure 11A:
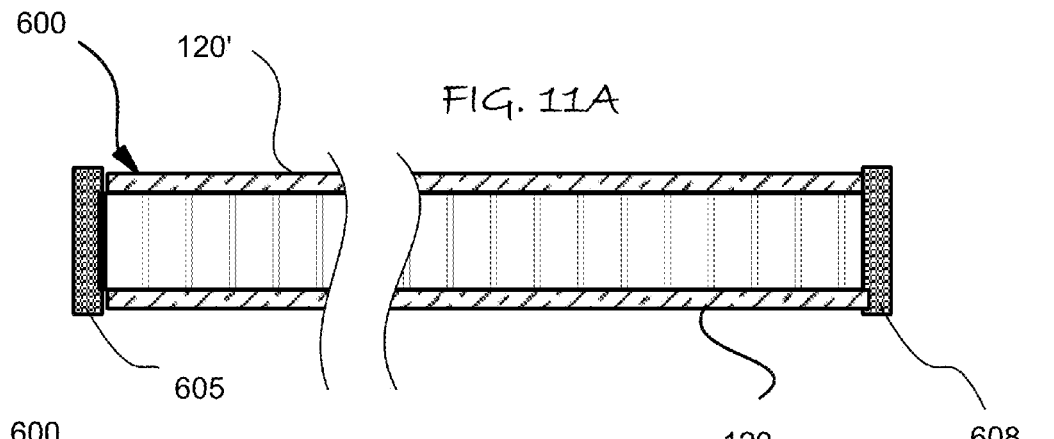
FIGS. 11A and 11B are schematic cross-sectional elevations of alternative embodiments of a light re-directing structure in a louver panel; shown in partially exploded perspective view in FIG. 11C, deploying macro spaced TIR surfaces and blackened sides.
Figure 11B:
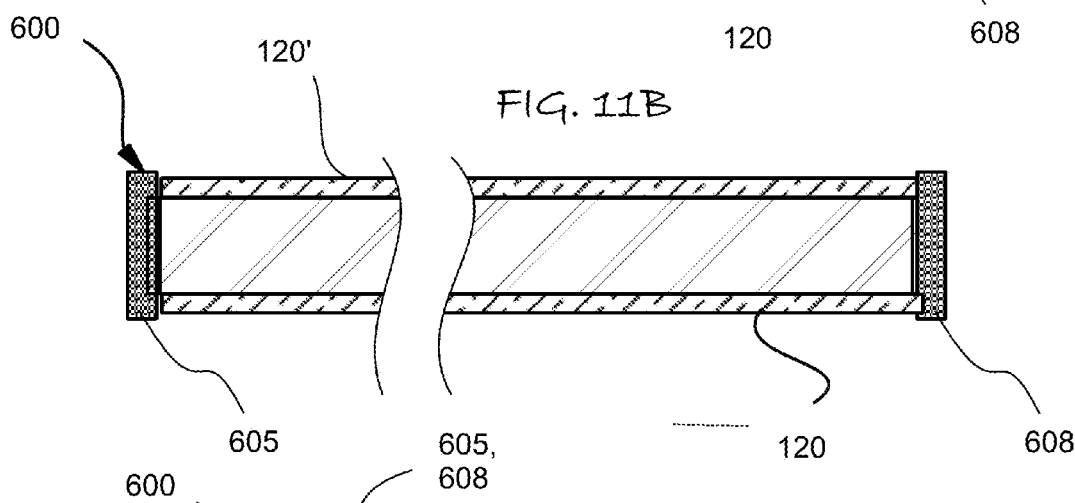
Figure 11C:
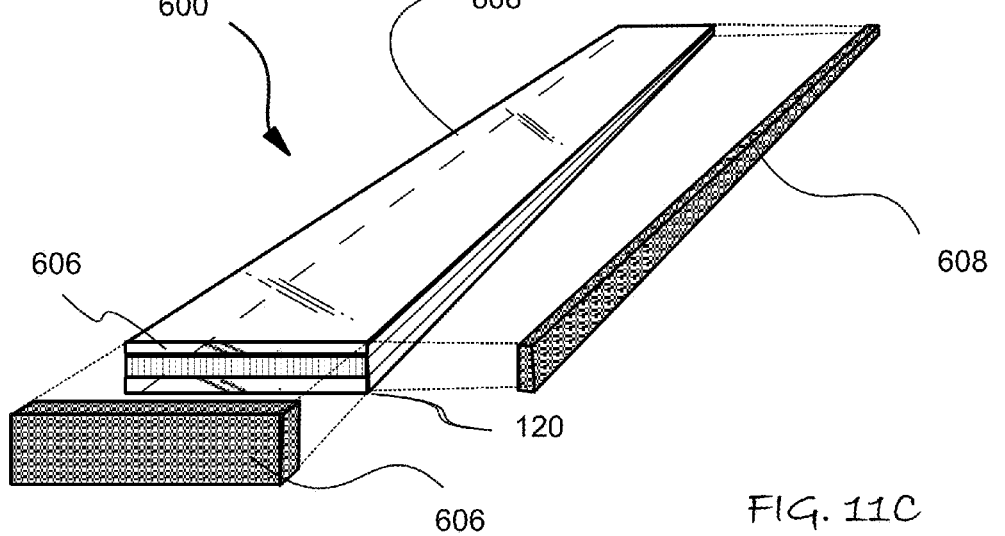

FIGS. 11A and 11B are schematic cross-sectional elevations of an alternative embodiment of a light re-directing structure in a louver panel or slat 600 shown in partially exploded perspective view in FIG. 11C deploying macro spaced optical elements and a black coating 608 or blackened long sides 605 and short edges 606. The slat has a front cover 120'. The TIR or metalized reflective surface of optical elements 110 in FIG. 11A are orthogonal to the covers 120 or 120', or the plane of the louver panel 600. Alternatively, as shown in FIG. 11B, the TIR or metalized reflective surface can be tilted, that is not orthogonal to the plane of the covers 120 or 120', or the plane of the louver panel 600. In either of these or other embodiment as shown in FIG. 11C the black coating 608 absorbs scattered light from the edges that would otherwise contribute to glare.

FIG. 12A is a schematic cross-sectional elevation of a preferred embodiment of a light re-directing structure in a louver panel 600 shown in perspective view in FIG. 12B deploying macro spaced TIR surfaces having a low radius of curvature at the corners 610*c* and 620*c'* to minimize glare. Sides 605 have a black coating 608. The TIR surfaces are the sides of elongated trapezoidal elements 610 of width W, defined by grooves 611 in panel 620. Hence, TIR surface 610*a* and 610*a'* are slightly tilted. The panel has an outer upper cover 120 to close the grooves 611. The grooves have a width F at the position of the cover sheet or panel 120, and are narrower at the lower root of width F'. The panel 600 can be formed by molding or casting. In the more preferred embodiment for the invention, the slats 600 deploy macro-optical element light directing structure which have a greater than 3:1 aspect ratio, a TIR surface pitch, P, of 0.5 mm or greater, and square corners 110*c* with a radius of curvature of less than about 5 µm. The projected area of the gap, 115, that provides the TIR surface, is preferably less than 1 to 2 percent of the face cross-section or pitch of the optical elements 110, that is F is less than 1 to 2% of the pitch, P, which equals W plus F. It should be appreciated that in the current commercial version of the trapezoidal optical element of the Milner patents described herein this ratio of projected area is 19%, and the preferred ranges for the macro-optical elements 110 are not achievable.

Figure 13A:
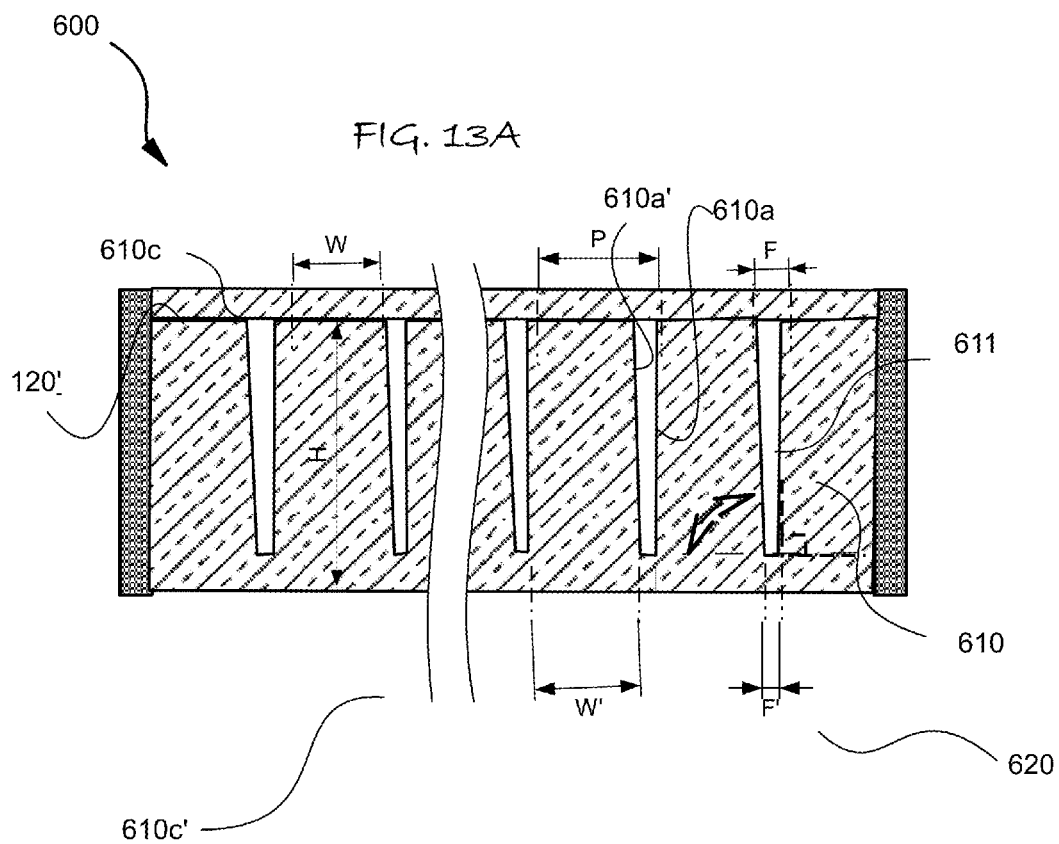
FIG. 13A is a schematic cross-sectional elevation of an alternative embodiment of a light re-directing structure in a louver panel shown in perspective view in FIG. 13B deploying macro spaced TIR surfaces and blackened sides. The slat has a front cover. The one of the two TIR surface is tilted, while the adjacent TIR surface is orthogonal to the sheet plane, forming the sides of asymmetric grooves.
Figure 13B:
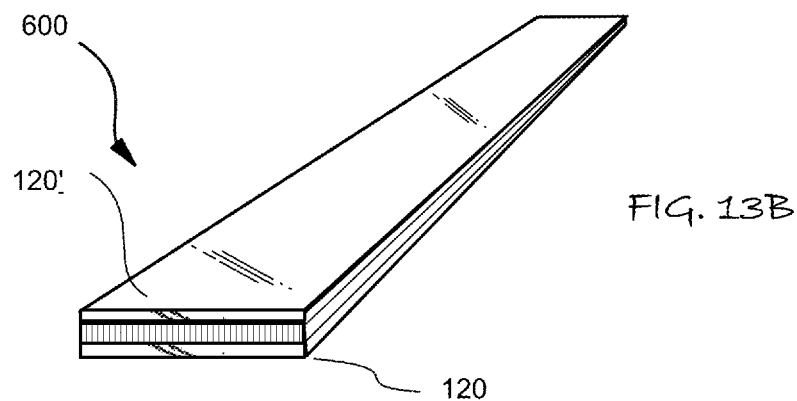

FIG. 13A is a schematic cross-sectional elevation of a preferred embodiment of a light re-directing structure in a louver panel 600 shown in perspective view in FIG. 13B deploying macro spaced TIR surfaces having a low radius of curvature at the corners to minimize glare. Sides 605 have a black coating 608. The TIR surface are the sides of elongated non-symmetrical trapezoidal elements 610 of width W, defined by asymmetrical grooves 611 in panel 620. Hence, TIR surface 610*a* is slightly tilted while TIR surface 610*a'* is orthogonal to the face of the planar panel 620. The panel 620 has an outer upper cover 120 to close the grooves 611. The grooves have a width F at the position the cover sheet or panel 120, and are narrower at the lower root of width F'. The panel 620 can be formed by molding or casting. In the more preferred embodiment for the invention, the slats 600 deploy macro-optical element light directing structure which have a greater than 1.5:1 aspect ratio, a TIR surface pitch, P, of 0.5 mm or greater, and square corner with a radius of curvature of less than about 5 µm.

FIG. 14A is a cross-sectional elevation of a ganged louver assembly 100, in which slats 600 have stepped offsets 616 so that adjacent bottoms and tops of louvers can mate at vertical orientation to provide see-through visibility in the center of each slat 600 between the offset edge 616, but exclude light from leaking through the otherwise horizontal gaps by these edge 616. This is illustrated as an expanded cross-sectional elevation in FIG. 14B. The step 616 simply requires an edge with a recess of one of the face layers, that is the substrate 120 extend at one side without the optical elements 110, and the opposing edge has an inner egress or step portion of the same length without the superstrate 120'. In such a case it would be advantageous to have sub-layers 120a and 120b in the substrate 120 and superstrate 120', so that at least a very thin sub-layer 120b and 120b' remains sealing the air gaps between TIR surfaces 110a and 110a'. However, the stepped edge 616 can be provided in other embodiments, particularly those in which the slat 600 or the slat body is molded. It is also preferable that the portions of the sub-layers 120a and 120b that form the step 616 are opaque, and are also relatively flexible so the louvers or slats 600 can tilt in the positive of negative direction about the vertical orientation, as indicate by arrow 601 in FIG. 14B. region 120a" in FIG. 14A is optionally flexible and opaque.

FIG. 15A is a cross-sectional elevation view of a louver assembly 1000 in a sealed window 1500, with inner and outer glass glazing panels 1201 and 1202. As shown in the expanded view of a portion of a slat or louver 600, in FIG. 15B, the superstrate in other embodiments can be eliminated as the gaps or grooves that provide TIR surfaces are in a sealed window.

Figure 16:
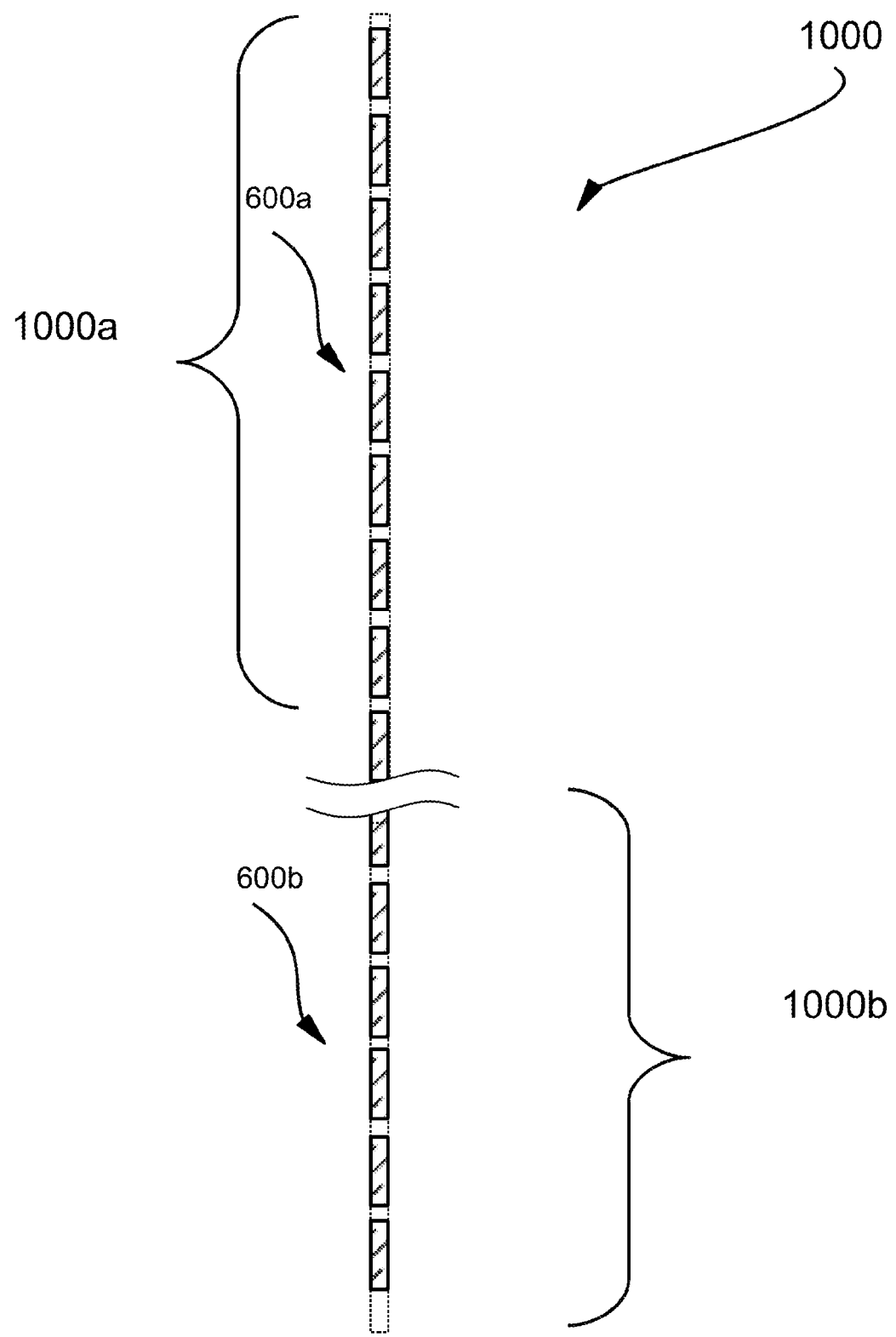
FIG. 16 is a cross-section elevation view of a general alternative louvered panel construction in which the louvers are separately operable and/or differ in an upper and lower portion.
Figure 17:
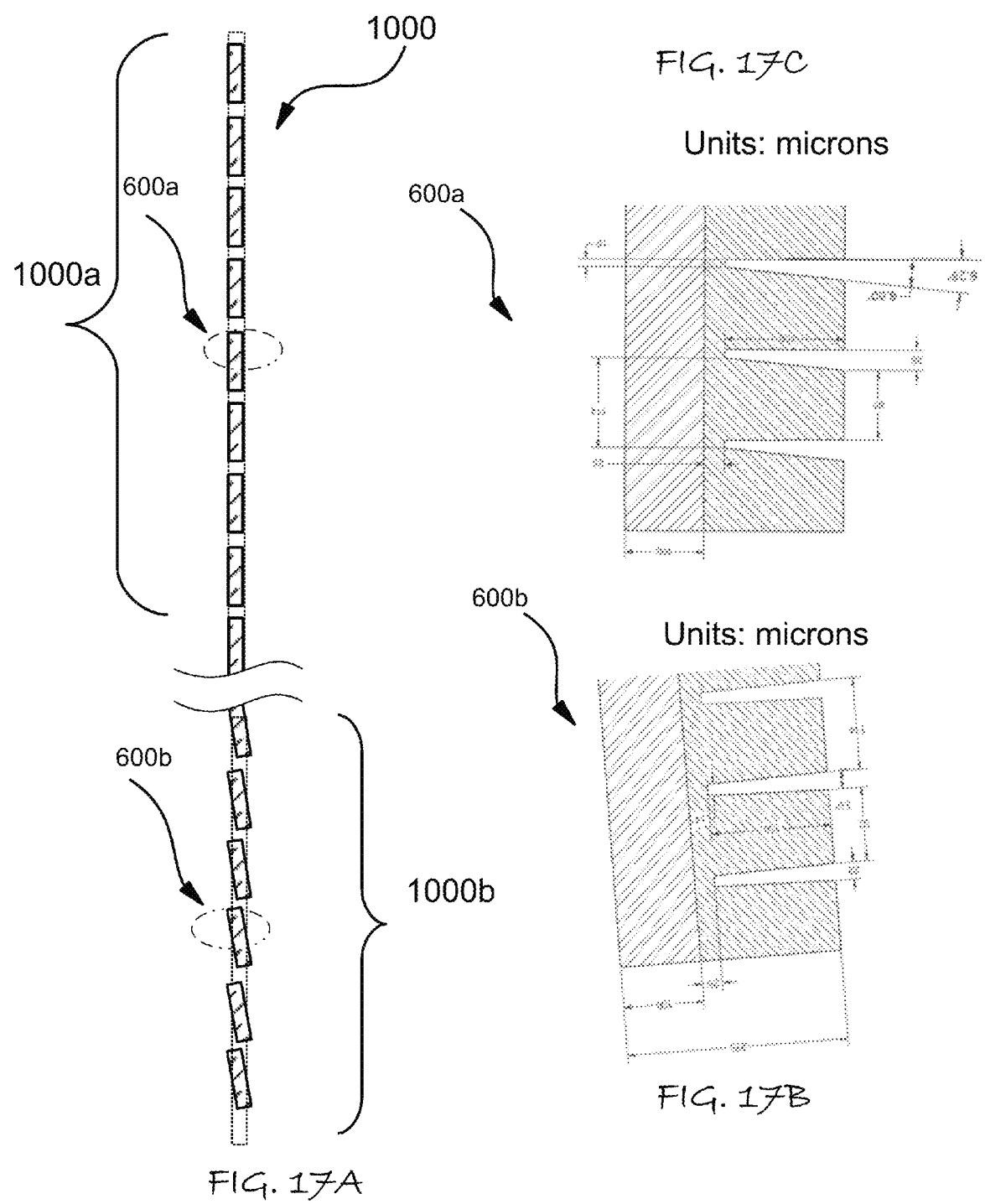
FIG. 17A-C are cross-sectional elevations of a more specific embodiment in which the louvers are separately operable and/or differ in an upper and lower portion.
Figure 18:
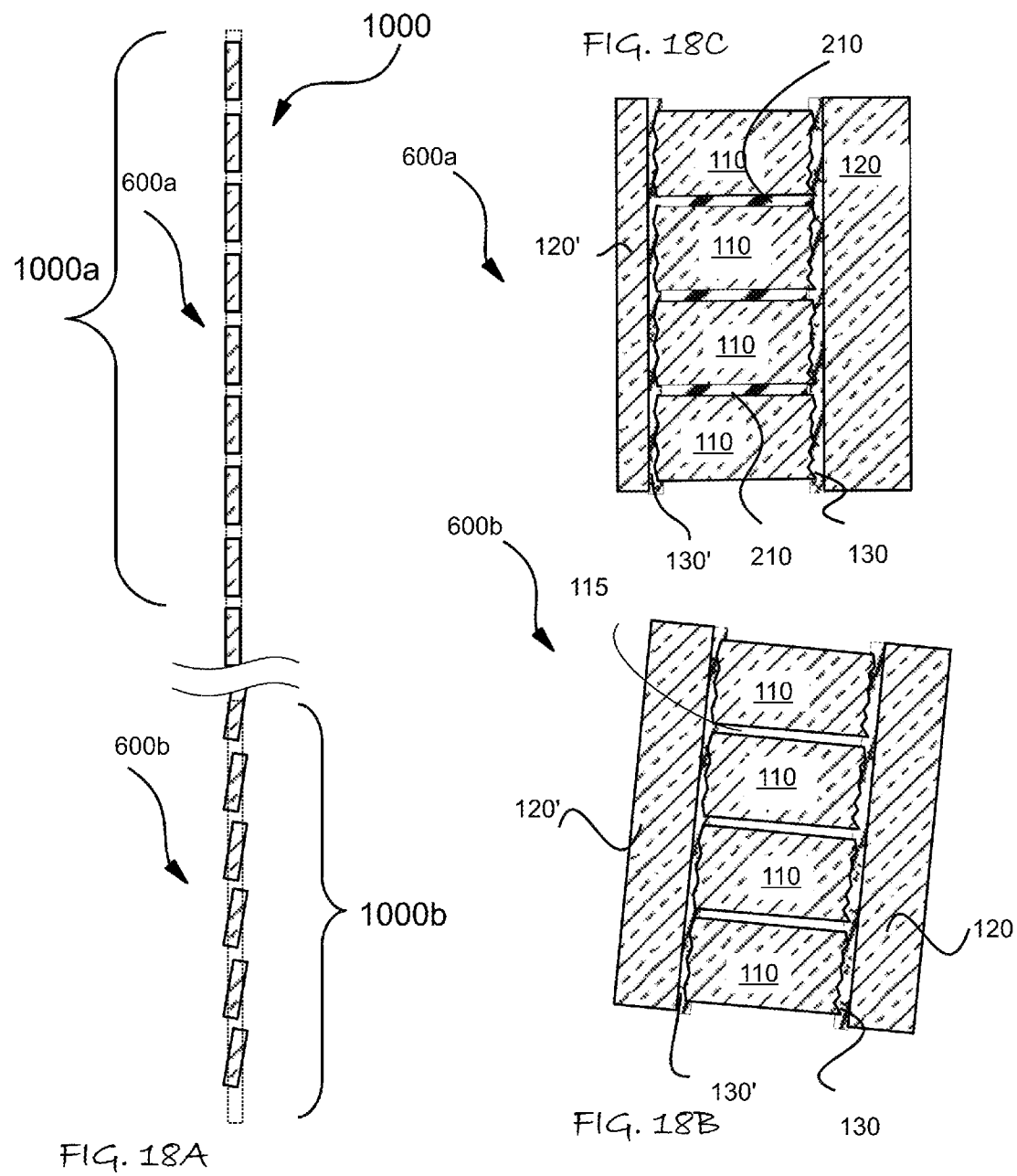
FIG. 18A-C are cross-sectional elevations of another more specific embodiment in which the louvers are separately operable and/or differ in an upper and lower portions.
Figure 19:
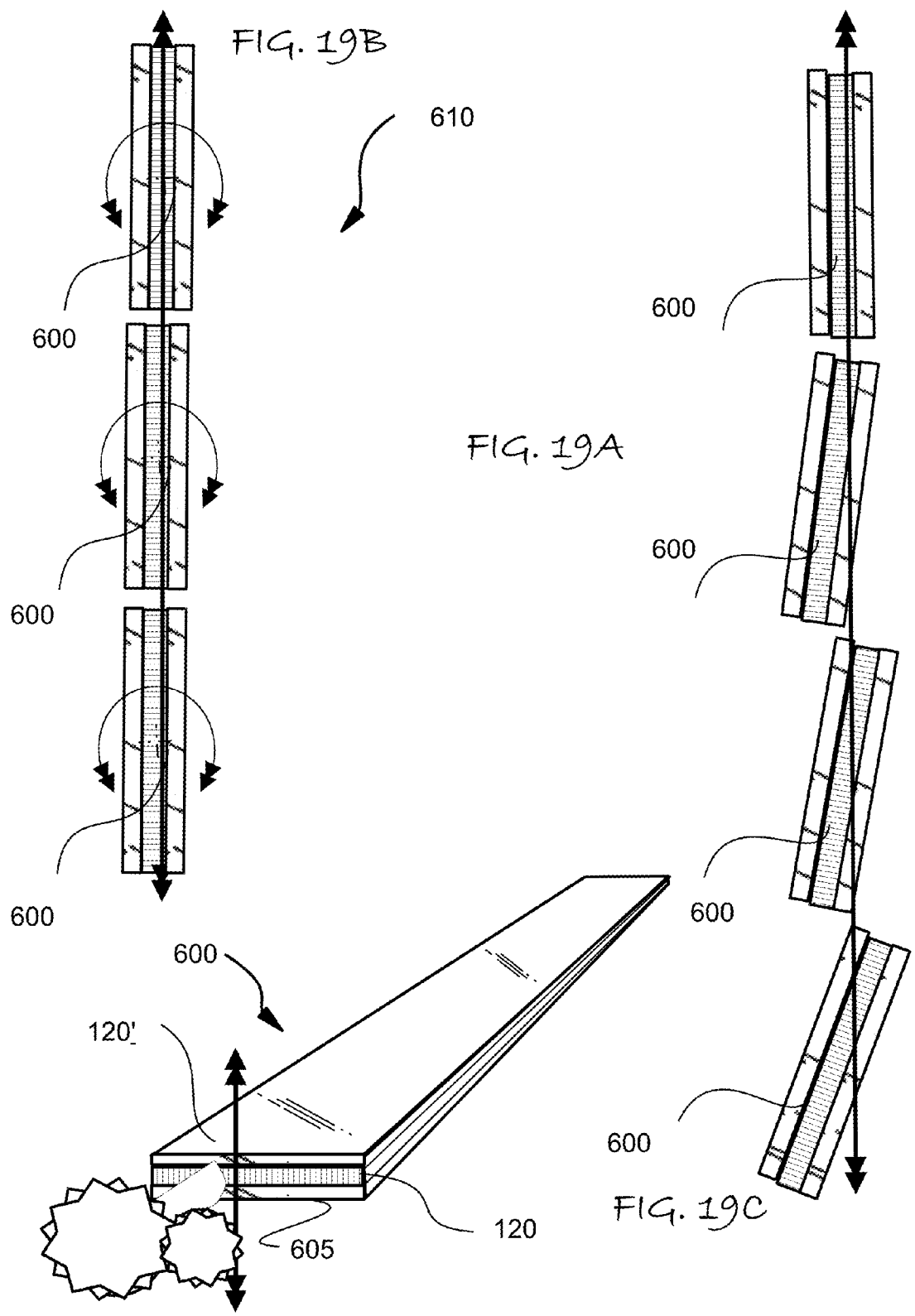
Figure 20:
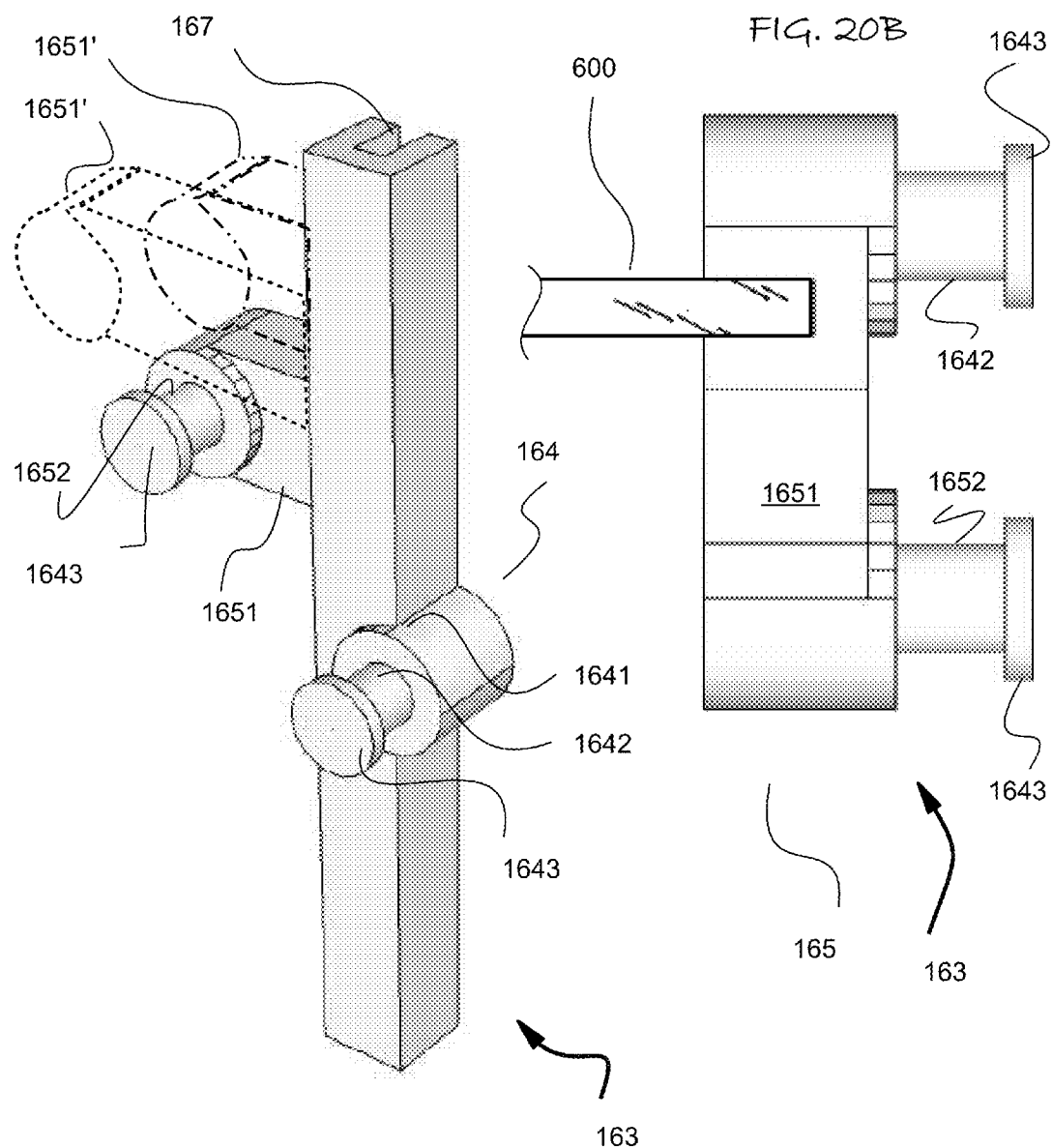
FIG. 20A is a perspective view of an isolated louver supporting end clip and FIG. 20 B is a top plan view thereof showing a portion of the attached louver.

FIG. 16 is a cross-section elevation view of an alternative louvered panel construction 1000 in which the louvers 600 are separately operable in an upper and lower portions. Upper portion 1000a and lower portion 1000b also optionally each deploy different slats 600, which are designated 600a in the upper section and 600b in the lower section in the embodiments that follow. The upper slats 600a would generally correspond with a clerestory portion of a window, and generally have relaxed requirements for see-through transparency in many applications.

In one embodiment the slats 600b in the lower portion 1000b are simply opaque, that is act as a conventional blind, but the louvers/slots 600a in the upper section 100a are independently rotatable to adjusting the light re-redirection during the day.

As shown in FIG. 17A-C, the louver assembly 1000 may deploy optical different elements in the slats/louvers 600 in different portions, as for example the symmetric TIR surface in FIG. 17B for lower portion 1000b, but asymmetric TIR surfaces in FIG. 17C in the upper portion 1000a. This provides a different capability for light re-direction during the day for the different portions. For example, in the clerestory or upper portion, it is desirable to direct light toward the ceiling for as long as possible as the sun changes relative position, whereas in the portion of the window corresponding with eye level it is more important to reduce glare and direct sunlight effects, but still provide see-through transparency.

In another embodiment the slats 600b in the lower portion 1000b have a different optical re-directing property than the louvers/slots 600a in the upper section 1000a, by deploying metalized faces 210 between optical elements 110, in slats 600a, rather than depending on an air gap 115 to provide TIR surfaces 110a and 110a'. Metalized faces 210 provide light re-direction at near normal incidence, when the geometric condition for TIR would not be met for certain slat rotation angles, particular in a slat deploying tilted reflective surface. Such an embodiment is illustrated in FIG. 18A-C.

For example, the different optical re-directing property can be the angle at which light is re-directed, such as by biasing or tilting the TIR or reflecting surface 110a and 110a', providing selective curvature, varying the aspect ratio, providing different constructions and/or combinations of macro- and micro light redirecting structure and the like.

Different light re-directing properties can also be provided by using an optical structure that deploys slats or louvers that are either identical, or different, in which each louver is adjustable to a different tilt angle.

FIGS. 19A and 19B are cross-sectional elevation views of an alternative louver assembly 1000 in which each of the louvers 600 are separately tiltable to different angles. Such differential rotation can be achieved by applying a gear mechanism at the rotating axle connection proximal to the short edge 605, in which a single cord or other actuator turns a first gear, and the first gear turns a second gear attached to the rotating axle. Varying the ratio of the first and second gear to each of the slats 600 provide the differential rotation for a given movement of the actuator. Further, it may be desirable to use louvers in which alternating reflective surfaces are blackened on in the lower portion 1000b where street light sources would be imaged, but not in the upper portion where they would contribute to night time lighting, only forming images on the ceiling, or if optical diffusing film is deployed providing for street level lighting to enter and diffuse off the interior ceiling, but without forming images and annoying patterns from traffic.

It should be understood that features, aspects and elements of one embodiment can be deployed in any other embodiment, as the inventive improvements in the slats 600 can be deployed in any louver assembly 1000. Further, the slats 600 in any louver assembly may utilize any form of an optical light re-directing structure. However, certain embodiments are more preferred as they are effective in eliminating glare.

In the more preferred embodiments, the louvers are intended to be largely vertical, so there is relatively little vertical gap between titled louvers as they track the sun. Hence, for someone inside a building to "see-through" the louver array to the outside of the building, the louvers muse be transparent to horizontal light rays in the vertical orientation of FIG. 3A-B, FIG. 14A-B and FIG. 19C.

Figure 21:
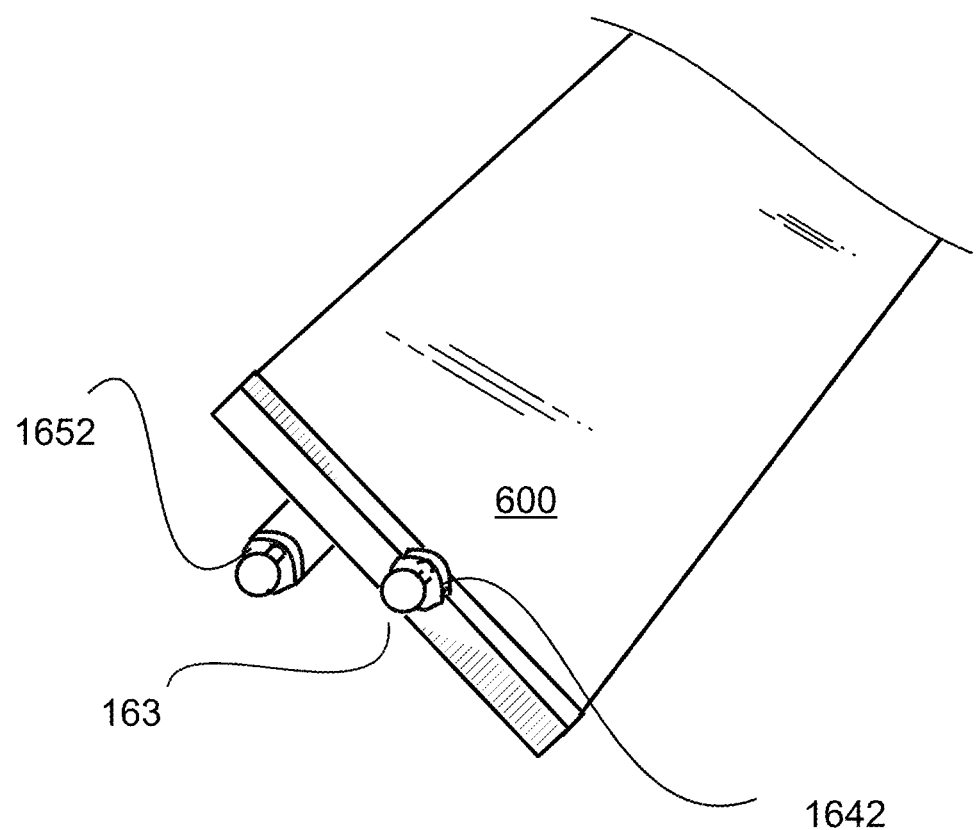
FIG. 21 is a perspective view of the end portion of a louver in the end clip.

In another more preferred embodiments the louvers 600 are held at the right and left side by an end clip 163, which are preferably opaque to blacken the sides and edges to reduce glare. Each louver 600 is supported on the opposing ends by either an end clip 163 (FIG. 20A-B and FIG. 21). The end clips 163 has an edge slot or jaw portion 167 to receive and frictionally grasp the short side of the louver 600. The opposing ends of the clip 163 from the slot or jaws 167 can be used to position variation means for connection to a common support and rotation mechanism, such as ropes, cable and rigid bars that would be vertically suspended in front of window. The extending pins or axles can directly engage a keyhole or other slots in the vertically hinging support bars, and can also support gears as described with respect to FIG. 19A-B The support pins on the end clips 163 have a nails style head 1643 to prevent escape from the lower position of the keyhole slots on a support bar. The end clip 163 supports pin 1652 between the upper face of the louver 600 and the center location of pin 1642 by an offsetting arm 1651. It should also be noted that in some implementation to allow louver 600 to rotate clockwise, and clip positioning pins 1652 is preferably extended away from clip body by arm 1651.

It should be appreciated that while center arm pin 1642 and positioning clip pin 1652 are on a common end clip 163 to reduce the number of parts in the assembled device, each can be associated with a separate adjacent end clip 163, and the location of the position clip pin 1652 can be adjusted for each louver 600 in the vertical stack.

The placement of the pins 1642 and 1652 can varied between adjacent louvers in a vertical stack to add an incremental bias away from a parallel orientation. Position clips 163 can be used to introduce an incremental bias angle. This variable bias or initial rotation can be achieved by each louver 600 being varied in position of the positioning pin 1652 from the central arm pin 1642, so as for example, the lowest louvers 600 would be the most offset from most vertical upper louvers 600. The offsetting arm 1651' can move on the end clip 163, or be configured to lengthen or rotate, as shown by alternative position in FIG. 20A as 1651".

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. A louver, comprising:
a) a generally rectangular planar support member having;
b) an upper surface and a lower surface opposite the upper surface,
c) an elongated front side on a side orthogonal to the plane of the upper surface, and an elongated back side opposed to and parallel with the front side,
d) a right side on another side that is orthogonal to both the upper surface and the front side, and a left side opposite the right side that is parallel to the right side,
e) a light redirecting structure that is at least one of attached to and disposed within the planar support member, the light redirecting structure comprising an array of spaced apart light reflective surfaces that terminate at corners, wherein the array extends across the planar support member from the front side to the back side in which each light reflective surface faces the front or back side,
f) wherein the light reflective surfaces have a periodic pitch of more than about 0.5 mm and the corners have a radius of curvature of less than 1% of pitch.

2. The louver according to claim 1 wherein the reflective surfaces are parallel to the each other.

3. The louver according to claim 1 wherein the reflective surfaces are tilted with respect to the front and back face.

4. The louver according to claim 1 wherein the louver is symmetrical about a reference plane that is parallel to and spaced apart an equal distance from the upper surface and the lower surface.

5. The louver according to claim 1 and further comprising an absorbing surface disposed parallel to and intervening between each light reflecting surface.

6. The louver according to claim 1 wherein the light reflective surface are metallic reflectors.

7. The louver according to claim 1 wherein the light reflective surfaces are total internal reflection (TIR) surfaces.

8. The louver according to claim 7 wherein the light re-directing structure is a film having grooves that define the TIR surface in which the film is laminated to the planar structure with a pressure sensitive adhesive.

9. The louver according to claim 1 wherein the light redirecting structure comprises:
a) a plurality of transparent solid polymeric bars having at least one light reflective surfaces oriented in facing the front or rear side, the bars having a common surface that is disposed at least nearly orthogonal to the at least one light reflective surface,
b) a first transparent planar support member connecting the common surfaces on a first side of the bars,
c) an adhesive material interposed between and connecting the polymeric bars and the planar support member, in which the adhesive material fills optical imperfection of the first side of the bars connected to the transparent planar support member.

10. A louver, comprising:
a) a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the right side that is parallel to the right side,
b) a light redirecting structure that is at least one of attached to and disposed within the planar support member, the light redirecting structure comprising a plurality of spaced apart reflective surface that are each parallel to the each other and extend across the planar support member orthogonal to the planes of the left and right sides of the planar support member;
c) wherein the planar rectangular support member is transparent and the reflective surfaces are formed on triangular elements that extend upward from a face of the planar rectangular support member and further comprising an elongated channel member having a planar bottom and opposing upright sides that extend in the same direction away from the planar bottom to provide a generally U-shaped cover member that is at least one of transparent and translucent on the planar bottom thereof, the U-shaped cover having ends that are upright sides attached to planar member proximal to the front and back faces to seal the reflective surfaces within the channel
d) wherein the spaced apart reflective surfaces have a periodic pitch of more than about 0.5 mm and the corners have a radius of curvature of less than 1% of pitch.

11. The louver according to claim 10 wherein the reflective surfaces are tilted with respect to the front and back side.

12. A louver, comprising:
a) a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the right side that is parallel to the right side,
b) a light redirecting structure that is at least one of attached to and disposed within the planar support member, the light redirecting structure comprising a plurality of spaced apart reflective surface that are each parallel to the each other and extend across the planar support member orthogonal to the planes of the left and right sides of the planar support member;

c) wherein the front and back sides thereof are stepped, and further d) wherein the light reflective surfaces have a periodic pitch of more than about 0.5 mm and the corners have a radius of curvature of less than 1% of pitch.

13. A louver according to claim 12 in which at least one of a stepped portion of the front and back side is at least one of opaque or transparent and flexible to permit movement past an adjacent louver in a ganged array.

14. A louver, comprising:
a) a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the right side that is parallel to the right side,
b) a light redirecting structure that is at least one of attached to and disposed within the planar support member, the light redirecting structure comprising a plurality of spaced apart reflective surfaces that are each parallel to the each other and extend across the planar support member orthogonal to the planes of the left and right sides of the planar support member;
c) wherein the front and back sides are light absorbing.

15. The louver according to claim 14 wherein the light redirecting structure is a flexible film laminated to one of the first and second surface with a pressure sensitive adhesive.

16. The louver according to claim 15 in which the reflective surface are TIR surfaces and a groove in the flexible film forms the TIR surface.

17. A louver according to claim 16 in which the TIR reflective surface are on the sides of elongated trapezoidal elements.

18. The louver according to claim 14 where the left side and right are disposed in end clips.

19. The louver according to claim 18 wherein the portion of the end clips that contacts the left and right sides provides a light absorbing structure to prevent glare.

20. A louver assembly comprising a linked array of the louver slats, each louver slat having;
a) a generally rectangular planar support member having an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the right side that is parallel to the right side,
b) a light redirecting structure that is at least one of attached to and disposed within the planar support member, the light redirecting structure comprising a plurality of spaced apart reflective surfaces and extend across the planar support member from the front face to the back face in which each reflective surface is orthogonal to the planes of the left and right sides of the planar support member;
c) wherein at least some of the louvers in the array are tiltable about a common central axis that extends between the right and lefts sides thereof,
d) the louvers in the arrays being subdivided by an upper sub-portion and a lower sub-portion below the upper sub-portion, in which each sub-portion is separately operable to differentially re-direct incident light different from the other sub-portion
e) wherein the light reflective surfaces have a periodic pitch of more than about 0.5 mm and the corners have a radius of curvature of less than 1% of pitch.

21. The louver assembly of claim 20 wherein the upper and lower sub-portions comprise louvers that are separately tiltable from the other sub-portion.

22. The louver assembly of claim 20 wherein the upper and lower sub-portions comprise louvers having different light re-directing, transmitting or absorbing properties.

23. The louver assembly of claim 22 in the louvers that comprise one of the upper and lower sub-portions have total internal reflection (TIR) reflective surface that are on sides of elongated trapezoidal elements.

24. The louver assembly of claim 20 wherein one of the upper and lower sub-portions comprise louvers having different light blocking properties and the louvers in the other sub-portion are see through louvers.

25. The louver assembly of claim 20 wherein at least one of the upper and lower sub-portions comprises louvers having a light redirecting structure that is flexible film laminated to one of the first and second surface with a pressure sensitive adhesive.

26. The louver assembly of claim 25 in which the reflective surface are TIR surfaces and a V-shaped groove in the flexible film forms the TIR surface.

27. The louver assembly of claim 20 in which the louvers are continuously tiltable by a common actuator in which the each louver is operative to tilt by a progressively increasing amount from at least the adjacent louvers in one of the sub-portions.

28. The louver assembly of claim 20 in which the light reflecting surface are each parallel to the each other.

29. The louver assembly of claim 20 in which each louver in the array is support at the left and right side by end clips.

30. The louver assembly of claim 20 in which one or more louvers in the array is disposed at a non-parallel orientation with respect to at least one adjacent louver.

31. The louver assembly of claim 30 in which each louver in the array is supported at the left and right side by end clips and the ends clips provide an angular bias that dispose the one or more louvers at a non-parallel orientation.

* * * * *